(12) United States Patent
Kato

(10) Patent No.: US 10,762,929 B2
(45) Date of Patent: Sep. 1, 2020

(54) DISPLAY OF CONTENT LIST IN RECORDING AND PLAYBACK APPARATUS

(71) Applicant: Sony Corporation, Tokyo (JP)

(72) Inventor: Motoki Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 275 days.

(21) Appl. No.: 13/680,609

(22) Filed: Nov. 19, 2012

(65) Prior Publication Data

US 2013/0139058 A1 May 30, 2013

(30) Foreign Application Priority Data

Nov. 28, 2011 (JP) ................................ 2011-258886

(51) Int. Cl.
| | |
|---|---|
| H04N 21/462 | (2011.01) |
| H04N 9/87 | (2006.01) |
| H04N 5/445 | (2011.01) |
| G11B 27/32 | (2006.01) |
| G11B 27/34 | (2006.01) |

(52) U.S. Cl.
CPC ............ *G11B 27/329* (2013.01); *G11B 27/34* (2013.01); *H04N 5/44543* (2013.01); *H04N 9/87* (2013.01); *H04N 21/4622* (2013.01)

(58) Field of Classification Search
CPC .. H04N 5/44543; H04N 21/4622; H04N 9/87; H04N 9/80; G11B 27/34; G11B 27/329
USPC ........................................................ 715/716
See application file for complete search history.

(56) References Cited

U.S. PATENT DOCUMENTS

| | | | | |
|---|---|---|---|---|
| 7,599,611 | B2* | 10/2009 | Seo et al. ...................... | 386/248 |
| 7,684,674 | B2* | 3/2010 | Hamada et al. .............. | 386/248 |
| 7,738,776 | B2 | 6/2010 | Kato et al. | |
| 8,306,383 | B2* | 11/2012 | Yahata .......................... | 386/200 |
| 2001/0024562 | A1* | 9/2001 | Nomura ............... | G11B 27/002 386/279 |
| 2001/0028787 | A1* | 10/2001 | Nomura ............... | G11B 27/002 386/283 |
| 2002/0046241 | A1* | 4/2002 | Nomura ................. | H04N 5/765 709/203 |
| 2002/0145702 | A1* | 10/2002 | Kato ....................... | G11B 20/10 352/1 |
| 2002/0150383 | A1* | 10/2002 | Kato ...................... | G11B 19/12 386/248 |
| 2003/0142950 | A1* | 7/2003 | Um ......................... | G11B 27/32 386/241 |
| 2003/0228134 | A1* | 12/2003 | Kim ...................... | G11B 27/034 386/281 |
| 2004/0120694 | A1* | 6/2004 | Hamada ........... | G11B 20/00086 386/248 |
| 2004/0234237 | A1* | 11/2004 | Hamada ............... | G11B 27/034 386/281 |
| 2005/0025461 | A1 | 2/2005 | Kato et al. | |
| 2005/0135787 | A1* | 6/2005 | Yoo et al. ....................... | 386/95 |

(Continued)

FOREIGN PATENT DOCUMENTS

JP 2002-158972 A 5/2002

*Primary Examiner* — Nicholas Klicos
(74) *Attorney, Agent, or Firm* — Chip Law Group

(57) ABSTRACT

An information processing apparatus includes an acquiring unit configured to acquire display information relevant to displaying a list of content items recorded to a recording medium, and a recording unit configured to collectively record the display information in a single file.

5 Claims, 25 Drawing Sheets

(56) References Cited

U.S. PATENT DOCUMENTS

| | | | |
|---|---|---|---|
| 2005/0207737 A1* | 9/2005 | Seo | G11B 20/12 386/241 |
| 2005/0234863 A1* | 10/2005 | Park et al. | 707/1 |
| 2005/0254363 A1* | 11/2005 | Hamada | G11B 27/034 369/47.1 |
| 2007/0033632 A1* | 2/2007 | Baynger et al. | 725/135 |
| 2007/0182741 A1* | 8/2007 | Chosokabe | G06F 3/04817 345/440 |
| 2007/0189722 A1* | 8/2007 | Hamada | G11B 27/034 386/241 |
| 2007/0206927 A1* | 9/2007 | Kim et al. | 386/95 |
| 2007/0206933 A1* | 9/2007 | Um et al. | 386/121 |
| 2008/0177775 A1* | 7/2008 | Kawate | G06F 17/3028 |
| 2009/0024927 A1* | 1/2009 | Schrock | G06Q 30/02 715/722 |
| 2009/0073598 A1* | 3/2009 | Yahata | G11B 17/028 360/71 |
| 2010/0011388 A1* | 1/2010 | Bull | H04N 21/41407 725/9 |
| 2010/0080534 A1* | 4/2010 | Kato et al. | 386/95 |
| 2010/0169303 A1* | 7/2010 | Biderman | H04N 7/17318 707/723 |
| 2011/0075994 A1* | 3/2011 | Hsiung | G11B 27/005 386/330 |
| 2011/0162009 A1* | 6/2011 | Adimatyam et al. | 725/40 |
| 2011/0252323 A1* | 10/2011 | Kobayashi | G11B 20/00086 715/716 |
| 2012/0075968 A1* | 3/2012 | Watanabe | G11B 27/034 369/30.08 |
| 2012/0075969 A1* | 3/2012 | Watanabe | G11B 27/034 369/30.08 |
| 2014/0297013 A1* | 10/2014 | Huffine | G06F 17/5009 700/97 |

* cited by examiner

FIG. 17

| Syntax | No. of bits | Mnemonic |
|---|---|---|
| INDEX.BAV () { | | |
|     type_indicator | 8*4 | bslbf |
|     version_number | 8*4 | bslbf |
|     reserved_for_future_use | 256 | bslbf |
|     length | 32 | uimsbf |
|     number_of_PlayLists | 16 | uimsbf |
|     for(k = 0; k<number_of_PlayLists; k++) { | | |
|         PlayList_file_name[k] | 8*5 | bslbf |
|         reserved_for_future_use | 8 | bslbf |
|         index_info_start_address[k] | 32 | uimsbf |
|     } | | |
|     for(i = 0; i<X; i++) { | | |
|         padding_word | 16 | bslbf |
|     } | | |
|     for(k = 0; k<number_of_PlayLists; k++) { | | |
|         index_info[k] () { | | |
|             ref_to_menu_thumbnail_index[k] | 16 | uimsbf |
|             PlayList_charactor_set[k] | 8 | uimsbf |
|             reserved_for_future_use | 7 | bslbf |
|             is_played_flag[k] | 1 | bslbf |
|             time_zone[k] | 8 | bslbf |
|             reserved_for_future_use | 7 | bslbf |
|             record_time_and_date[k] | 4*14 | bslbf |
|             PlayList_duration[k] | 4*6 | bslbf |
|             channel_number[k] | 16 | uimsbf |
|             reserved_for_future_use | 8 | bslbf |
|             channel_name_length[k] | 8 | uimsbf |
|             channel_name[k] | 8*20 | bslbf |
|             PlayList_name_length[k] | 8 | uimsbf |
|             PlayList_name[k] | 8*255 | bslbf |
|             length_mpd[k] | 16 | bslbf |
|             if(length_mpd != 0) { | | |
|                 mdp[k] () { | | |
|                     maker_ID[k] | 16 | uimsbf |
|                     maker_model_code[k] | 16 | uimsbf |
|                     maker_privete_data[k] | (length_mpd-4)*8 | |
|                 } | | |
|             } | | |
|         } | | |
|         for(i = 0; i<Y; i++) { | | |
|             padding_word | 16 | bslbf |
|         } | | |
|     } | | |
| } | | |

FIG. 18

| Syntax | No. of bits | Mnemonic |
|---|---|---|
| xxxxx.RPL/yyyyy.VPL { | | |
|     PlayListMark_Start_address | 32 | uimsbf |
|     MakerPrivateData_Start_address | 32 | uimsbf |
|     reserved | 192 | bslbf |
|     PlayList() | | |
|     for(i=0; i<N1; i++){ | | |
|         padding_word | 16 | bslbf |
|     } | | |
|     PlayListMark() | | |
|     for(i=0; i<N2; i++){ | | |
|         padding_word | 16 | bslbf |
|     } | | |
|     MakerPrivateData() | | |
| } | | |

FIG. 20

| Syntax | No. of bits | Mnemonic |
|---|---|---|
| PlayList() { | | |
|     version_number | 8*4 | bslbf |
|     length | 32 | uimsbf |
|     PlayList_type | 8 | uimsbf |
|     CPI_type | 1 | bslbf |
|     reserved | 7 | bslbf |
|     UIAppInfoPlayList() | | |
|     number_of_PlayItems    // main path | 16 | uimsbf |
|     if(<Virtual PlayList>) { | | |
|         number_of_SubPlayItems    // sub path | 16 | uimsbf |
|     }else{ | | |
|         reserved | 16 | bslbf |
|     } | | |
|     for(PlayItem_id=0;<br>        PlayItem_id<number_of_PlayItems;<br>        PlayItem_id++){ | | |
|         PlayItem()    // main path | | |
|     } | | |
|     if(<Virtual PlayList>) { | | |
|         if(CPI_type==0 && PlayList_type==0) { | | |
|             for(i=0; i<number_of_SubPlayItems; i++) | | |
|                 SubPlayItem()    // sub path | | |
|         } | | |
|     } | | |
| } | | |

FIG. 21

| Syntax | No. of bits | Mnemonic |
|---|---|---|
| UIAppInfoPlayList() { | | |
|     length | 32 | uimsbf |
|     reserved_for_future_use | 16 | bslbf |
|     PlayList_character_set | 8 | uimsbf |
|     reserved_for_word_align | 4 | bslbf |
|     playback_protect_flag | 1 | bslbf |
|     write_protect_flag | 1 | bslbf |
|     is_played_flag | 1 | bslbf |
|     is_edited_flag | 1 | bslbf |
|     time_zone | 8 | bslbf |
|     reserved_for_word_align | 8 | bslbf |
|     record_time_and_date | 4*14 | bslbf |
|     PlayList_duration | 4*6 | bslbf |
|     maker_ID | 16 | uimsbf |
|     maker_model_code | 16 | uimsbf |
|     channel_number | 16 | uimsbf |
|     reserved_for_word_align | 8 | bslbf |
|     channel_name_length | 8 | uimsbf |
|     channel_name | 8*20 | bslbf |
|     PlayList_name_length | 8 | uimsbf |
|     PlayList_name | 8*255 | bslbf |
|     PlayList_detail_length | 16 | uimsbf |
|     PlayList_detail | 8*1200 | bslbf |
| } | | |

FIG. 22

| Syntax | No. of bits | Mnemonic |
|---|---|---|
| PlayListMark() { | | |
|     version_number | 8*4 | bslbf |
|     length | 32 | uimsbf |
|     number_of_PlayList_marks | 16 | uimsbf |
|     for(i=0; i<number_of_PlayList_marks; i++) { | | |
|         reserved | 8 | bslbf |
|         mark_type | 8 | bslbf |
|         mark_time_stamp | 32 | uimsbf |
|         PlayItem_id | 8 | uimsbf |
|         reserved | 24 | uimsbf |
|         character_set | 8 | bslbf |
|         name_length | 8 | uimsbf |
|         mark_name | 8*256 | bslbf |
|         ref_thumbnail_index | 16 | uimsbf |
|     } | | |
| } | | |

FIG. 23

| MARK TYPE VALUE | MEANING | NOTE |
|---|---|---|
| 0x00 | RESERVED FOR FUTURE USE | |
| 0x01 | PLAYLIST THUMBNAIL IMAGE SELECTED FROM PICTURE IN VIDEO REFERENCED BY PLAYLIST | · MARK_TIME_STAMP INDICATES THE PRESENTATION TIME STAMP OF THE PICTURE IN THE VIDEO REFERENCED BY THE PLAYLIST<br>· IF THE VALUE OF REF_THUMBNAIL_INDEX IS OTHER THAN 0xFFFF, THUMBNAIL IMAGE IS STORED IN MENU.THM OF FIG. 24<br>· IF THE VALUE OF REF_THUMBNAIL_INDEX IS 0xFFFF, THUMBNAIL IMAGE IS NOT STORED IN MENU.THM OF FIG. 24. IN THIS CASE, THE PLAYER MAY DECODE THE PICTURE SPECIFIED BY THE PRESENTATION TIME STAMP IN THE VIDEO REFERENCED BY THE PLAYLIST.<br>· THE NUMBER OF 0x01 OR 0x02 MARK TYPE VALUES IN PLAYLISTMARK() IS 0 OR 1 |
| 0x02 | PLAYLIST THUMBNAIL IMAGE NOT SELECTED FROM PICTURE IN VIDEO REFERENCED BY PLAYLIST | · THE VALUE OF REF_THUMBNAIL_INDEX IS OTHER THAN 0xFFFF. THUMBNAIL IMAGE IS STORED IN MENU.THM OF FIG. 24.<br>· MARK_TIME_STAMP AND PLAYITEM_ID ARE SET TO ZERO<br>· THE NUMBER OF 0x01 OR 0x02 MARK TYPE VALUES IN PLAYLISTMARK() IS 0 OR 1 |
| 0x03 | RESUME-MARK | · RESUME POINT. THE NUMBER OF RESUME POINTS DEFINED IN PLAYLISTMARK() IS 0 OR 1. |
| 0x04 | BOOK-MARK | · PLAYBACK ENTRY POINT INTO PLAYLIST. THIS MARK MAY BE SET BY THE USER, AND IS USED AS A MARK SPECIFYING THE START POINT OF A FAVORITE SCENE, FOR EXAMPLE. |
| 0x06 | SKIP-START-MARK | · SKIP MARK POINT. THE PLAYER SKIPS THE REST OF THE PROGRAM FROM THIS POINT UNTIL THE END. THE NUMBER OF SKIP MARK POINTS DEFINED IN PLAYLISTMARK() IS 0 OR 1. |

FIG. 24

| Syntax | No. of bits | Mnemonic |
|---|---|---|
| MENU.THM/MARK.THM { | | |
|     reserved | 256 | bslbf |
|     Thumbnail() | | |
|     for(i=0; i<N1; i++) | | |
|         padding_word | 16 | bslbf |
| } | | |

FIG. 25

| Syntax | Bits | Mnemonic |
|---|---|---|
| Thumbnail() { | | |
|     version_number | 8*4 | char |
|     length | 32 | uimsbf |
|     if (length !=0) { | | |
|         tn_blocks_start_address | 32 | bslbf |
|         number_of_thumbnails | 16 | uimsbf |
|         tn_block_size | 16 | uimsbf |
|         number_of_tn_blocks | 16 | uimsbf |
|         reserved | 16 | bslbf |
|         for(i=0; i<number_of_thumbnail; i++) { | | |
|             thumbnail_index | 16 | uimsbf |
|             thumbnail_picture_format | 8 | bslbf |
|             reserved | 8 | bslbf |
|             picture_data_size | 32 | uimsbf |
|             start_tn_block_number | 16 | uimsbf |
|             x_picture_length | 16 | uimsbf |
|             y_picture_length | 16 | uimsbf |
|             reserved | 16 | uimsbf |
|         } | | |
|         stuffing_bytes | 8*2*L1 | bslbf |
|         for(k=0; k<number_of_tn_blocks; k++) { | | |
|             tn_block | tn_block_size* 1024*8 | |
|         } | | |
|     } | | |
| } | | |

DISPLAY OF CONTENT LIST IN RECORDING AND PLAYBACK APPARATUS

CROSS-REFERENCE TO RELATED APPLICATION

The present application claims priority from Japanese Patent Application No. JP 2011-258886 filed in the Japanese Patent Office on Nov. 28, 2011, the entire content of which is incorporated herein by reference.

BACKGROUND

The present technology relates to an information processing apparatus, an information processing method, and a program, and more particularly to an information processing apparatus, information processing method, and program configured to be able to rapidly display a list of content items.

Recording and playback apparatus have recently become more prevalent, and it is typical for a user to record broadcast audio-visual (AV) signals to disk and play them back at a desired time. Since AV signals are digitized and compressible, many hours' worth of AV signals can be recorded to disk.

The Inventor has proposed technology for the after-recording of audio signals (see Japanese Unexamined Patent Application Publication No. 2002-158972, for example).

Meanwhile, besides disks such as Blu-ray Discs, Digital Versatile Discs (DVDs), and hard disks, semiconductor memory such as flash memory cards are also used as recording media for recording content, including AV signals.

Such recording media are growing in capacity which, in conjunction with the digitization of signals, means that such recording media are becoming more and more capable of recording large amounts of content. As a result, whereas the number of content items recordable to a single recording medium may have been approximately 200 items at most in the past, that number has increased greatly and may now be 10000 items or more.

SUMMARY

Meanwhile, when playing back content that has been recorded to a recording medium, the user selects a desired content item from among the recorded content items and issues playback instructions. In order to do so, it is typical to display a list of titles for recorded content items and prompt the user to select a desired content item from that list.

However, creating and displaying a list of content items recorded to the recording medium becomes more time-consuming as the number of content items increases. As a result, it becomes difficult for the user to rapidly select desired content.

In light of such circumstances, it is desirable to be able to rapidly display a list of content items.

An information processing apparatus according to an embodiment of the present technology is provided with an acquiring unit configured to acquire display information relevant to displaying a list of content recorded to a recording medium, and a recording unit configured to collectively record the display information in a single file.

The display information may at least include the title, duration, and record time and date for each content item.

The file may be positioned on the same level as a directory where the content items are recorded.

The display information may additionally include location information expressing the locations of thumbnails for the content items, and the acquiring unit may acquire titles, durations, and record times and dates for the content items from a first information file while acquiring the location information from a second information file that differs from the first information file.

Information regarding the manufacturer of the information processing apparatus may be additionally recorded in the file.

The information processing apparatus may be additionally provided with a displaying unit configured to display a list of the content items from the display information read out from the file.

The display information may additionally include an ID for the manufacturer of the information processing apparatus and information specific to that manufacturer, and the displaying unit may additionally display the manufacturer-specific information in the case where the manufacturer ID included in the display information matches a manufacturer ID being stored in the information processing apparatus.

An information processing method according to another embodiment of the present technology involves acquiring display information relevant to displaying a list of content recorded to a recording medium, and collectively recording the display information in a single file.

A program according to another embodiment of the present technology causes a computer to execute a process that involves acquiring display information relevant to displaying a list of content recorded to a recording medium, and collectively recording the display information in a single file.

In an embodiment of the present technology, display information relevant to displaying a list of content recorded to a recording medium is acquired, and the display information is collectively recorded in a single file.

As above, according to an embodiment of the present technology, it is possible to rapidly display a list of content items.

BRIEF DESCRIPTION OF THE DRAWINGS

FIG. 17 illustrates the syntax of INDEX.BAV;

FIG. 18 illustrates the syntax of xxxxx.RPL and xxxxx.VPL;

FIG. 20 illustrates the syntax of PlayList;

FIG. 21 illustrates the syntax of UIAppInfoPlayList;

FIG. 22 illustrates the syntax of PlayListMark;

FIG. 23 illustrates a mark_type table;

FIG. 24 illustrates the syntax of MENU.THM/MARK.THM;

FIG. 25 illustrates the syntax of Thumbnail;

DETAILED DESCRIPTION OF EMBODIMENTS

Figure 1:
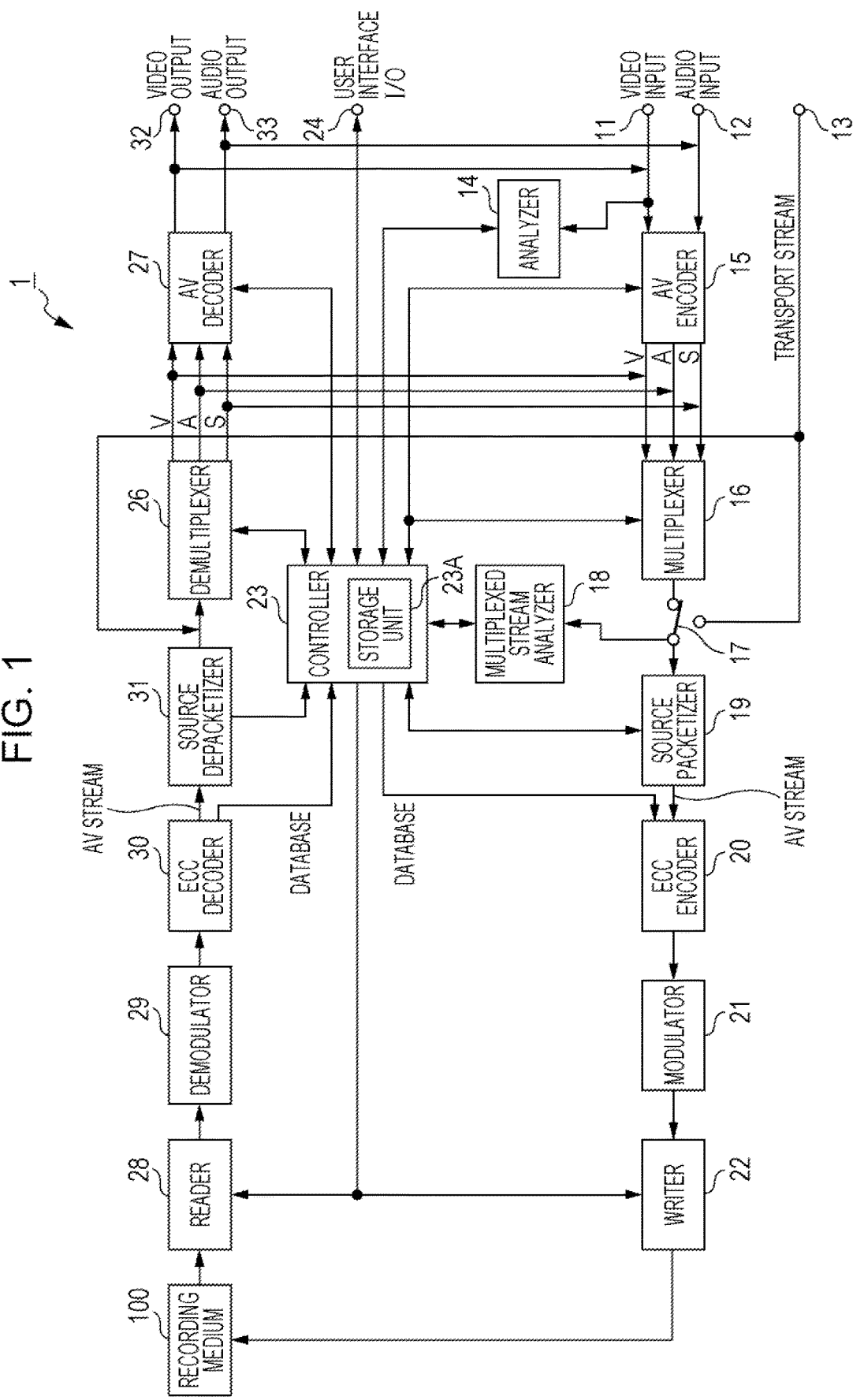
FIG. 1 illustrates a configuration of an embodiment of an information processing apparatus to which the present technology has been applied.

Hereinafter, embodiments for carrying out the present technology (hereinafter designated embodiments) will be described. Hereinafter, the description will proceed in the following order.

1. Configuration of recording and playback apparatus
2. AV stream editing
3. Functional configuration of controller
4. Operation
5. PlayLists
6. Editing Real PlayLists
7. Operations performed on Virtual PlayLists
8. Re-editing Virtual PlayLists
9. Marks
10. Thumbnails
11. Directories and files
12. INDEX.BAV file
13. Real PlayList files and Virtual PlayList files
14. PlayList syntax
15. UIAppInfoPlayList
16. PlayListMark( )
17. MENU.THM and MARK.THM
18. AV stream files
19. Recording process
20. Playback process
21. Applying present technology to program
22. Other

CONFIGURATION OF RECORDING AND PLAYBACK APPARATUS

Hereinafter, embodiments of the present technology will be described with reference to the drawings. FIG. 1 illustrates an exemplary internal configuration of an embodiment of an information processing apparatus to which the present technology has been applied. First, the configuration of the portion that operates to record an externally input signal to a recording medium will be described. A recording and playback apparatus 1 acts as an information processing apparatus that executes at least one of either recording or playing back information, and is configured to be able to accept analog data or digital data as input and record input data.

An analog video signal and an analog audio signal are input into terminals 11 and 12, respectively. A video signal input into terminal 11 is respectively output to an analyzer 14 and an AV encoder 15. An audio signal input into terminal 12 is output to the AV encoder 15. The analyzer 14 extracts features such as scene changes from the input video signal.

The AV encoder 15 respectively encodes the input video signal and audio signal, and outputs an encoded video stream (V), an encoded audio stream (A), and system information (S) such as AV sync information to a multiplexer 16.

The encoded video stream may be a video stream encoded in the MPEG-2 format of the Moving Pictures Experts Group, for example, while the encoded audio stream may be an audio stream encoded in the MPEG-1 format or an audio stream encoded in the Dolby AC3 format, for example. The multiplexer 16 multiplexes the input video and audio streams on the basis of the input system information, and outputs the result to a multiplexed stream analyzer 18 and a source packetizer 19 via a switch 17.

The multiplexed stream may be an MPEG-2 transport stream or an MPEG-2 program stream, for example. The source packetizer 19 takes the input multiplexed stream, and in accordance with the application format of a recording medium 100 for recording that stream, encodes an AV stream made up of source packets. The AV stream is subjected to given processing by an error-correcting code (ECC) encoder 20 and a modulator 21, and is output to a writer 22. The writer 22 writes (i.e., records) an AV stream file to the recording medium 100 on the basis of a control signal output from a controller 23. Herein, the recording medium 100 may be realized with a disk such as a Blu-ray Disc, Digital Versatile Disc (DVD), or hard disk, or with semiconductor memory such as a flash memory card.

A transport stream such as a digital television broadcast input from a digital interface or a digital television tuner is input into a terminal 13. There are two ways of recording a transport stream input into the terminal 13. One way is by transparently recording the transport stream, while the other way is by recording after re-encoding the transport stream for some purpose such as lowering the recording bit rate. Information specifying the recording method is input into the controller 23 from a terminal 24 connected to a user interface (not illustrated).

In the case of transparently recording an input transport stream, the transport stream input into the terminal 13 is output to the multiplexed stream analyzer 18 and the source packetizer 19. Subsequent processing up to recording an AV stream to the recording medium 100 is similar that of the case of encoding and recording an input audio signal and video signal as discussed earlier, and for this reason further description thereof will be omitted.

In the case of first re-encoding and then recording an input transport stream, the transport stream input into the terminal 13 is input into a demultiplexer 26. The demultiplexer 26 demultiplexes the input transport stream to extract a video stream (V), an audio stream (A), and system information (S).

Of the streams (or in other words information) extracted by the demultiplexer 26, the video stream is output to an AV decoder 27, while the audio stream and system information are output to the multiplexer 16. The AV decoder 27 decodes the input video stream and outputs the resulting playback video signal to the AV encoder 15. The AV encoder 15 encodes the input video signal and outputs an encoded video stream (V) to the multiplexer 16.

The audio stream and system information that were output from the demultiplexer 26 and input into the multiplexer 16 as well as the video stream output from the AV encoder 15 are multiplexed on the basis of the input system information, and the result is output as a multiplexed stream to the multiplexed stream analyzer 18 and the source packetizer 19 via the switch 17. Subsequent processing up to recording an AV stream to the recording medium 100 is similar that of the case of encoding and recording an input audio signal and video signal as discussed earlier, and for this reason further description thereof will be omitted.

The recording and playback apparatus 1 according to the present embodiment records an AV stream file to the recording medium 100, and additionally records application database information describing that file. Application database information is created by the controller 23. Information input into the controller 23 includes motion image feature information from the analyzer 14, AV stream feature information from the multiplexed stream analyzer 18, and user instruction information input from the terminal 24.

Motion image feature information supplied from the analyzer 14 is information regarding characteristic images in an input motion image signal, which may for example include information (such as marks) specifying the program start point, scene change points, and commercial start and end points, as well as thumbnail image information for the images at those specified locations.

AV stream feature information from the multiplexed stream analyzer 18 is information regarding the encoding of the AV stream to be recorded, which may for example include address information for I pictures in the AV stream, the encoding parameters of the AV stream, information on points where the encoding parameters change in the AV stream, and information (such as marks) regarding characteristic images in the video stream.

User instruction information from the terminal 24 may be information specifying playback segments that have been specified by the user, text characters describing the content of such playback segments, and information on bookmarks set at user-preferred scenes or resume points.

The controller 23 may be realized by a microprocessor unit, for example, and include a storage unit 23A that stores given information. On the basis of the above input information, the controller 23 creates a database of AV streams (Clips), a database of groupings (PlayLists) of AV stream playback segments (PlayItems), management information on the recorded contents of the recording medium 100 (INFO.BAV), and thumbnail image information. Similarly to an AV stream, application database information made up of the above such information is processed by the ECC encoder 20 and modulator 21, and input into the writer 22. The writer 22 records a database file to the recording medium 100 on the basis of a control signal output from the controller 23.

The above application database information will be discussed in detail later.

An AV stream file (or in other words a file of image data and audio data) and application database information recorded to the recording medium 100 in this way are processed as follows in the case of playback. First, the controller 23 instructs a reader 28 to read out application database information from the recording medium 100. The reader 28 then reads out application database information from the recording medium 100, and that application database information is processed by a demodulator 29 and an ECC decoder 30 and input into the controller 23.

On the basis of the application database information, the controller 23 outputs a list of PlayLists recorded to the recording medium 100 (or in other words a list of content) to the terminal 24 connected to the user interface input/output. Obviously, the list of PlayLists may also be output as video output from a terminal 32 to a display (not illustrated). When the user selects a desired PlayList (or in other words content) from the list of PlayLists, information regarding the PlayList specified for playback is input into the controller 23 from the user interface input/output at the terminal 24. The controller 23 instructs the reader 28 to read out the AV stream files corresponding to that PlayList. Following the instructions, the reader 28 reads out the corresponding AV stream files from the recording medium 100 and outputs them to the demodulator 29. An AV stream input into the demodulator 29 is subjected to given processing and demodulated, is further processed by the ECC decoder 30, and output to a source depacketizer 31.

The source depacketizer 31 takes an application-format AV stream that has been read out from the recording medium 100 and subjected to given processing, and converts it into a stream that can be output to the demultiplexer 26. The demultiplexer 26 takes the video stream (V), the audio stream (A), and the system information (S) such as AV sync information constituting a playback segment (or in other words a PlayItem) in an AV stream specified by the controller 23, and outputs them to the AV decoder 27. The AV decoder 27 decodes the video stream and the audio stream, and outputs a playback video signal and a playback audio signal from respectively corresponding terminals 32 and 33.

Also, in the case where information specifying random access playback or special playback is input from the user interface via the terminal 24, the controller 23 determines the position at which to read out the AV stream from the recording medium 100 on the basis of information in the AV stream (Clip) database, and instructs the reader 28 to read out that AV stream. For example, in the case of playing back a user-selected PlayList from a given point in time, the controller 23 instructs the reader 28 to read out data from the I picture with the timestamp that is closest to the specified time.

Also, in the case where the user instructs fast-forward playback, the controller 23 instructs the reader 28 to sequentially read out I picture data in the AV stream on the basis of the AV stream (Clip) database.

The reader 28 reads out AV stream data from a specified random access point, and the data thus read out is played back after being processed by subsequent units. AV stream editing Next, the case where the user edits AV streams recorded to the recording medium 100 will be described. Consider the case where the user wants to create a new playback sequence by specifying playback segments in AV streams recorded to the recording medium 100. For example, the user may want to create a playback sequence in which the portion featuring a singer a in a music program called Program A is played back, and subsequently, the portion featuring the singer a in a music program called Program B is played back. In this case, information on the start points (in points) and end points (out points) of the playback segments is input into the controller 23 from the user interface via the terminal 24. The controller 23 creates a database (PlayList) that groups the AV stream playback segments (PlayItems).

In the case where the user wants to delete part of an AV stream recorded to the recording medium 100, information on the in point and out point of the segment to be deleted is input into the controller 23 from the user interface via the terminal 24. The controller 23 modifies the PlayList database so as to reference just the remaining portion of the AV stream, and additionally instructs the writer 22 to delete the specified portion of the AV stream.

A description will now be given for the case where the user wants to create a new playback sequence by specifying playback segments in AV streams recorded to the recording medium 100, but also wants to seamlessly connect the respective playback segments. In such a case, the controller creates a database (PlayList) that groups the AV stream playback segments (PlayItems), and in addition, partially re-encodes and re-multiplexes the video stream near the connection points between playback segments.

First, picture information at an in point and picture information at an out point of a playback segment is input into the controller 23 from the terminal 24. The controller 23 instructs the reader 28 to read out data relevant to playing back pictures at the in point and pictures at the out point. The reader 28 then reads out data from the recording medium 100, and that data is output to the demultiplexer 26 via the demodulator 29, ECC decoder 30, and source depacketizer 31.

The controller 23 analyzes the data input into the demultiplexer 26 and determines a re-encoding method (i.e., modifies the picture coding type and allocates an encode bit rate for re-encoding) and a re-multiplexing technique for the video stream, and supplies the parameters to the AV encoder 15 and the multiplexer 16.

Next, the demultiplexer 26 separates the input stream into a video stream (V), an audio stream (A), and system information (S). The video stream includes data to be input into the AV decoder 27, and data to be input into the multiplexer 16. The data to be input into the AV decoder 27 is the data that is to be re-encoded. This data is decoded by the AV decoder 27, and the decoded pictures are re-encoded by the AV encoder 15 to obtain a video stream. The data to be input into the multiplexer 16 is data that is copied from the original stream without re-encoding. The audio stream and the system information are input directly into the multiplexer 16.

The multiplexer 16 multiplexes the input streams on the basis of information input from the controller 23, and outputs a multiplexed stream. The multiplexed stream is processed by the ECC encoder 20 and the modulator 21, and is input into the writer 22. The writer 22 records the AV stream to the recording medium 100 on the basis of a control signal supplied from the controller 23.

Functional Configuration of Controller

Figure 2:
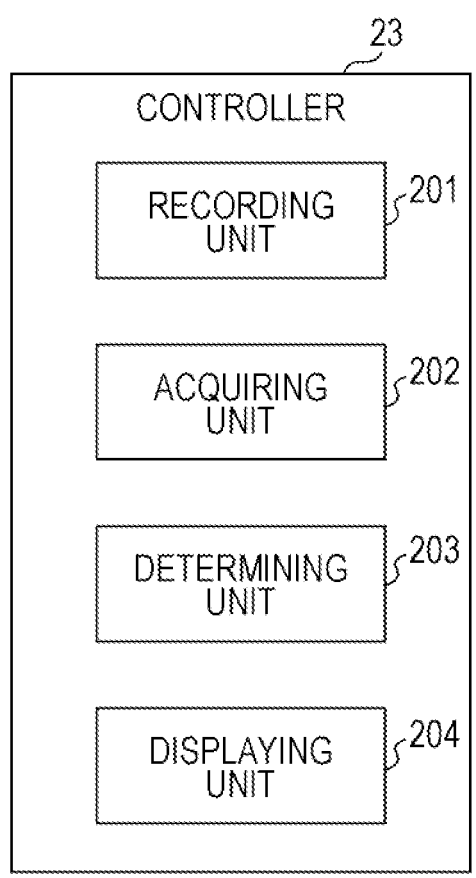
FIG. 2 is a block diagram illustrating a functional configuration of a controller.

FIG. 2 is a block diagram illustrating a functional configuration of the controller 23. In this embodiment, the controller 23 includes a recording unit 201, an acquiring unit 202, a determining unit 203, and a displaying unit 204. These units may be realized in hardware, for example, but may also be realized in software.

The recording unit 201 records various information. The acquiring unit 202 acquires various information. The determining unit 203 conducts determination processes. The displaying unit 204 conducts display processes.

Operation

Figure 3:
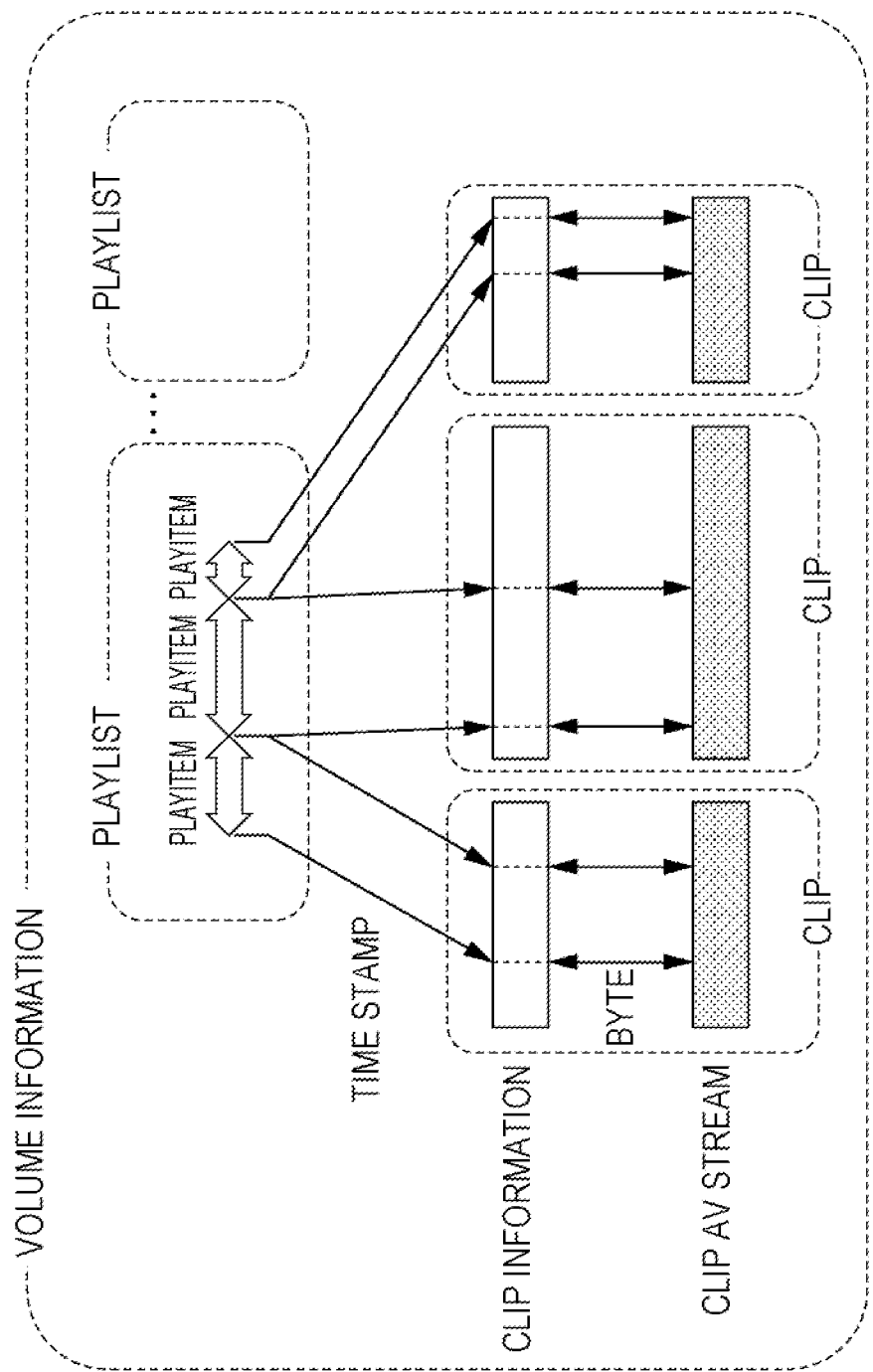
FIG. 3 explains a format for data recorded to a recording medium by a recording and playback apparatus.

Hereinafter, application database information and operations such as playback and editing based on such information will be described. FIG. 3 explains the structure of an application format. The application format has two layers, PlayList and Clip, for managing AV streams. All Clip and PlayList data on disk is managed under Volume Information. Herein, a single AV stream and its metadata is thought of as a single object, called a Clip. An AV stream file is called a Clip AV stream file, while its metadata is called a Clip information file.

A single Clip AV stream file stores data in which an MPEG-2 transport stream is arranged in a structure defined by the application format. Although files are typically treated as byte sequences, the contents of a Clip AV stream file unfolds on a time axis, and entry points in a Clip are primarily specified on a time basis. The Clip information file is useful for finding address information on where to start reading data in the Clip AV stream file when given an access point timestamp for a given Clip.

PlayLists

Figure 4:
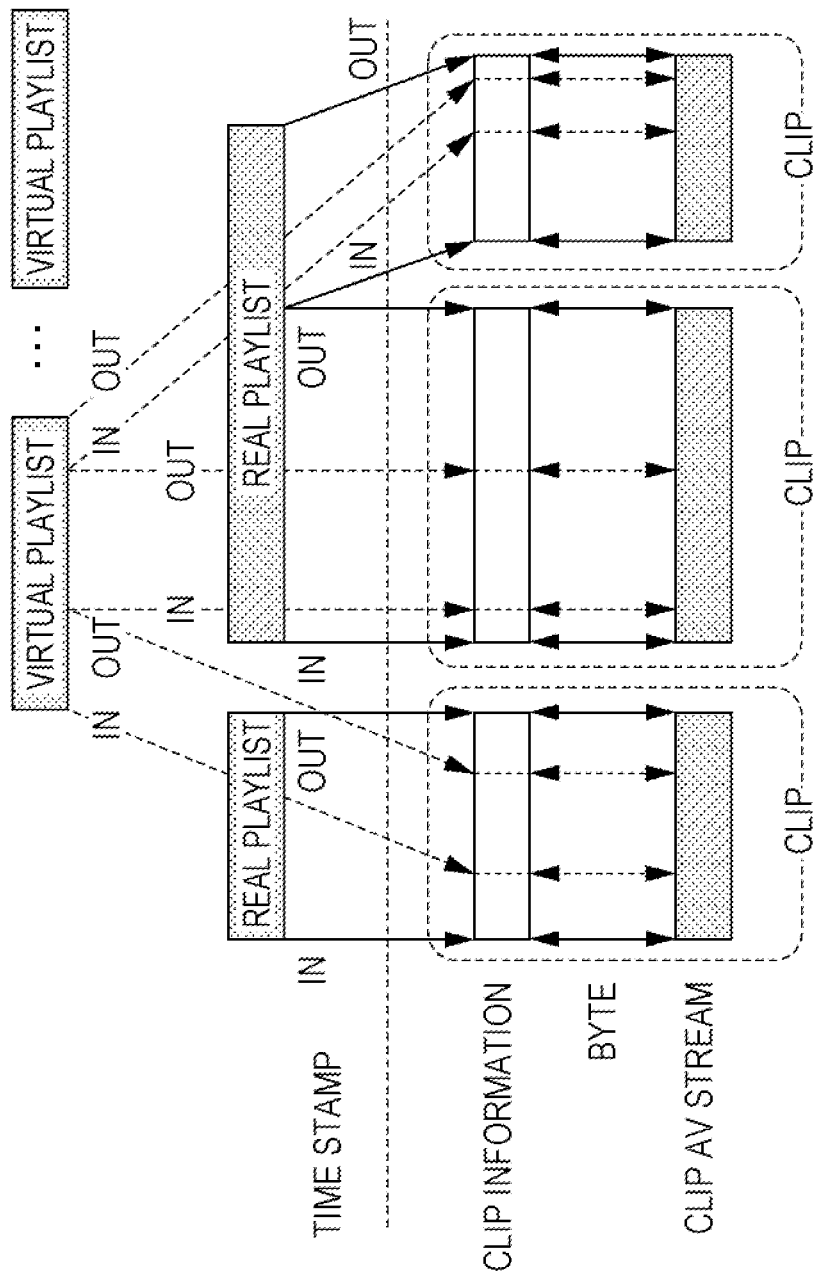
FIG. 4 explains Real PlayLists and Virtual PlayLists.

PlayLists will now be described with reference to FIG. 4. PlayLists are provided in order to enable the user to select and easily edit desired playback segments from a Clip. A single PlayList is a collection of playback segments in a Clip. A single playback segment in a given Clip is called a PlayItem, and is expressed by a pair of points (an in point and an out point) on the time axis. Consequently, a PlayList is formed by grouping a plurality of PlayItems.

There are two types of PlayLists. One type is a Real PlayList, and the other type is a Virtual PlayList. A Real PlayList coexists with the Clip stream portions it references. In other words, a Real PlayList occupies an amount of space on disk equivalent to the Clip stream portions it references, and if a Real PlayList is deleted, the data for the Clip stream portions it references will also be deleted.

A Virtual PlayList does not coexist with Clip data. Consequently, no change occurs in the contents of a Clip when a Virtual PlayList is modified or deleted.

Editing Real PlayLists

Figure 5A:
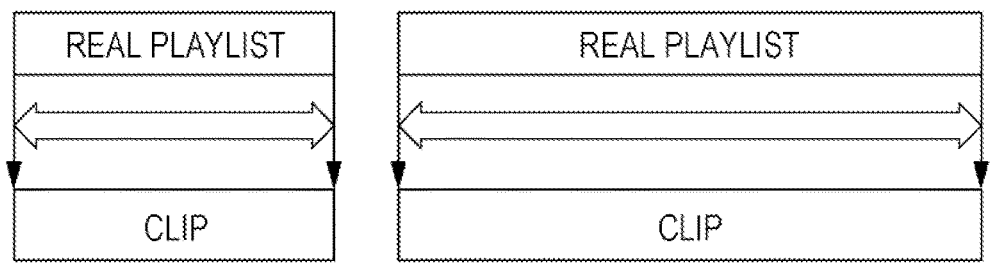
FIGS. 5A to 5C explain the creation of a Real PlayList.

Next, the editing of Real PlayLists will be described. FIG. 5A illustrates Real PlayList creation. Creation is an operation where, in the case where an AV stream is recorded as a new Clip, a new Real PlayList referencing that entire Clip is created.

Figure 5B:
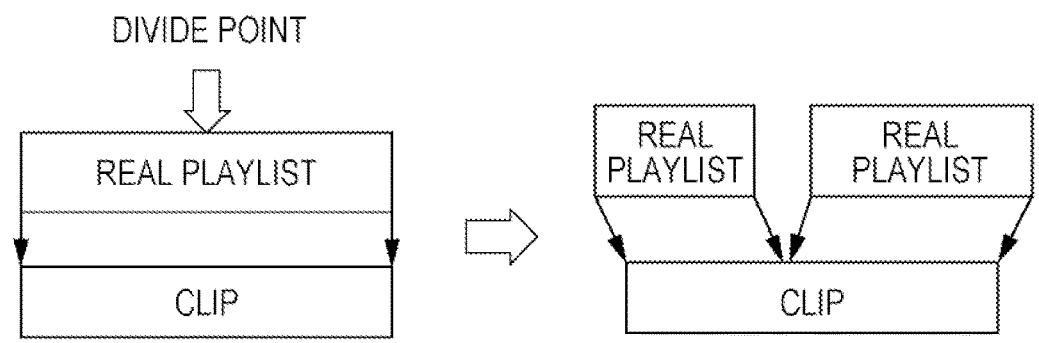

FIG. 5B illustrates Real PlayList division. Division is an operation where a Real PlayList is divided into two Real PlayLists at a desired point. Such a division operation may be conducted in the case where two programs are being managed in a single Clip managed by a single PlayList, for example. In this case, the user may want to re-register (re-record) the programs as separate objects. Note that Clip content is not modified as a result of a division operation (i.e., the Clip itself is not divided).

Figure 5C:
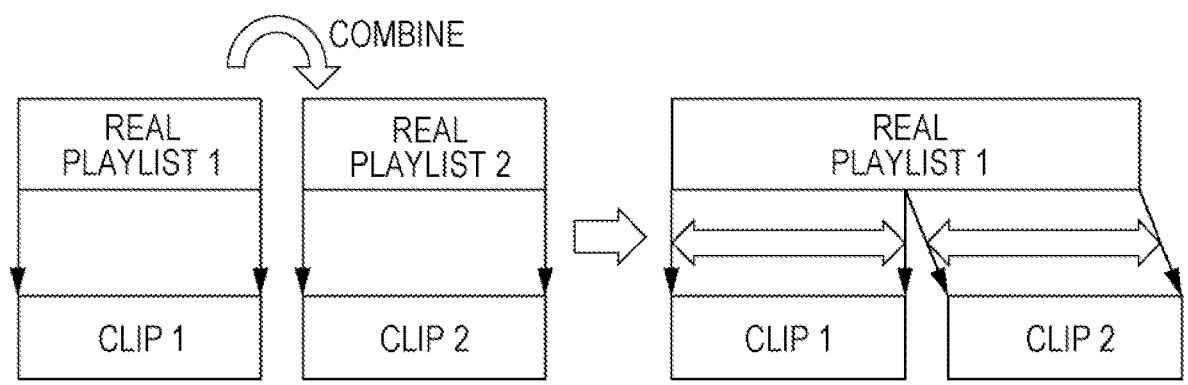

FIG. 5C illustrates Real PlayList combining. Combining is an operation where two Real PlayLists are combined to form one new Real PlayList. Such a combining operation may be conducted when the user wants to re-register two programs as a single program, for example. Note that Clips are not modified as a result of a combining operation (i.e., the Clips themselves are not combined into one Clip).

Figure 6A:
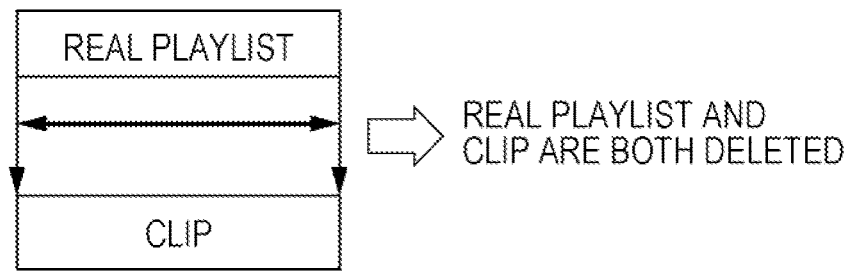
FIGS. 6A to 6C explain the deletion of a Real PlayList.

FIG. 6A illustrates the deletion of an entire Real PlayList. In the case where an operation to entirely delete a given Real PlayList is performed, the corresponding stream portion of the Clip referenced by the deleted Real PlayList is also deleted.

Figure 6B:
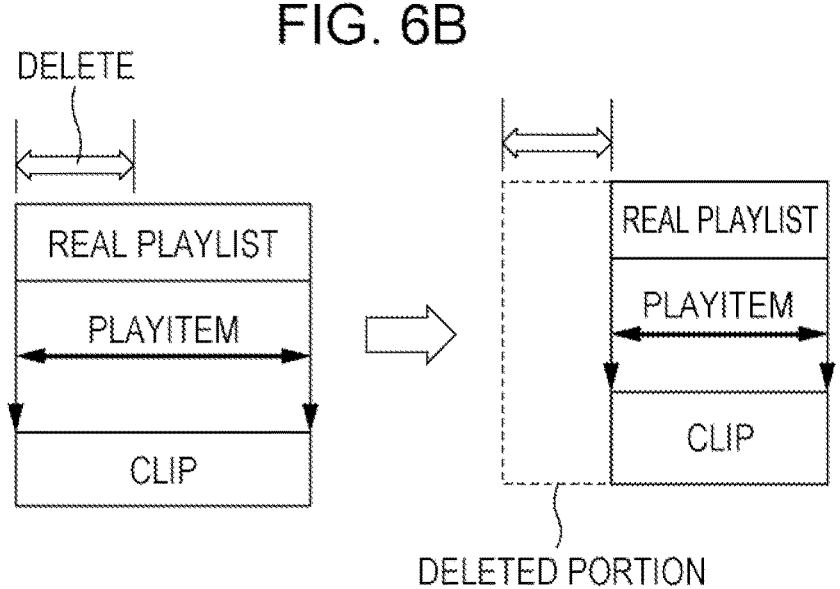

FIG. 6B illustrates partial deletion of a Real PlayList. In the case where a desired portion of a Real PlayList is deleted, the corresponding PlayItem is modified so as to reference just the remaining stream portion of the Clip. In addition, the corresponding stream portion of the Clip is deleted.

Figure 6C:
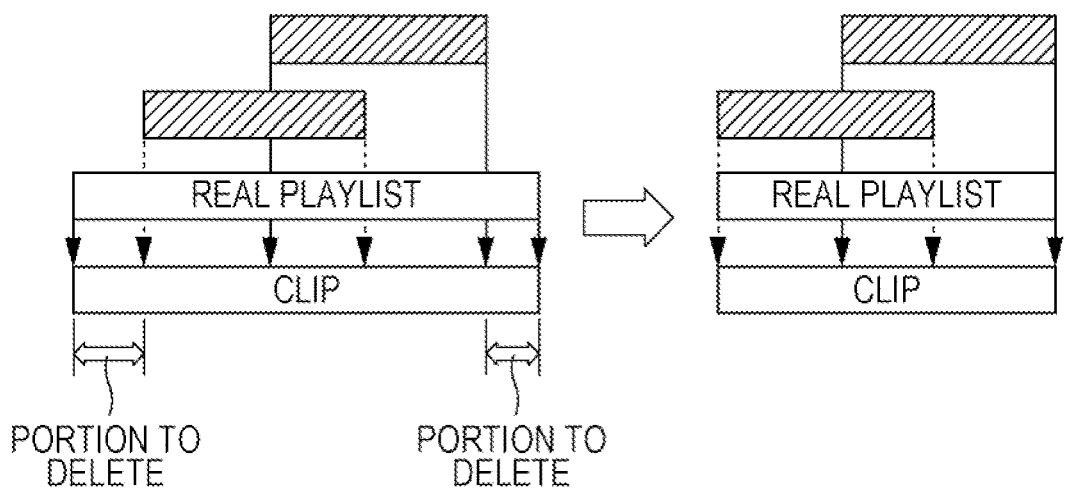

FIG. 6C illustrates Real PlayList minimizing. Minimizing is an operation where the PlayItems corresponding to a Real PlayList are modified to reference just the Clip stream portions associated with one or more Virtual PlayLists. Corresponding Clip stream portions that are not associated with a Virtual PlayList are deleted.

Consider the case where a Real PlayList is modified and the stream portion of a Clip referenced by that Real PlayList is deleted by an operation like those described above. In such a case, if there exists a Virtual PlayList using the deleted Clip, it is possible that problems may occur due to the deleted Clip in the Virtual PlayList.

In order to avoid such a situation, a message may be presented to the user in response to a delete operation, such as "The specified Real PlayList references a Clip stream portion that is also referenced by a Virtual PlayList. If the Real PlayList is deleted, the Virtual PlayList will also be deleted. Are you sure you want to continue?" After thus prompting for confirmation (i.e., warning the user), the deletion process is executed or canceled according to user instructions. Alternatively, it may be configured such that the Real PlayList is minimized instead of deleting the Virtual PlayList.

Operations performed on Virtual PlayLists

Figure 7A:
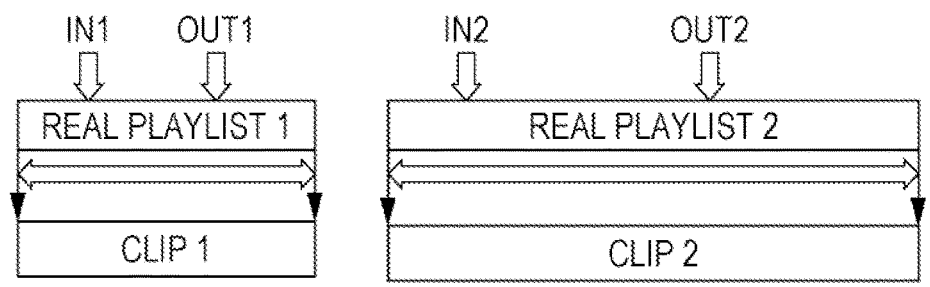
FIGS. 7A and 7B explain assemble editing.
Figure 7B:
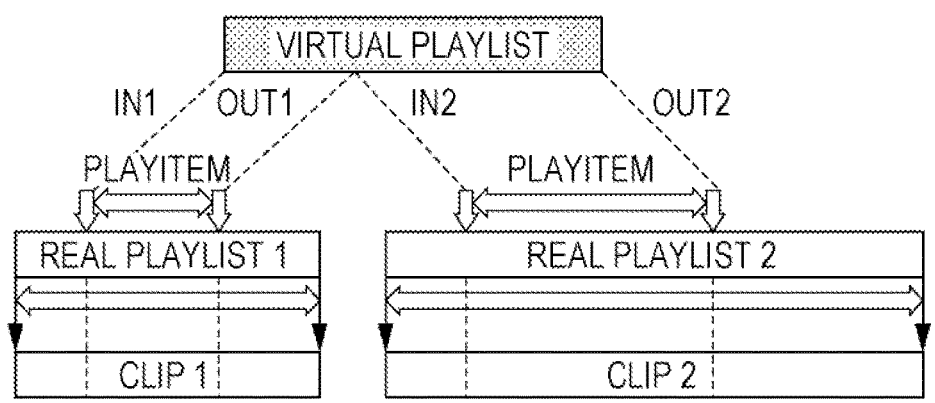

Next, operations performed on Virtual PlayLists will be described. Clip contents are not modified when operations are performed on Virtual PlayLists. FIGS. 7A and 7B illustrate assemble editing (in-out editing), an operation where PlayItems and a Virtual PlayList are created for playback segments that the user wants to watch. Seamless connections between PlayItems are supported by the application format.

As illustrated in FIG. 7A, in the case where there exist two Real PlayLists 1 and 2 with Clips 1 and 2 that respectively correspond to the Real PlayLists, the user may specify a given segment in the Real PlayList 1 (i.e., the segment from In 1 to Out 1, designated the PlayItem 1) as a playback segment, and also specify a given segment in the Real PlayList 2 (i.e., the segment from In 2 to Out 2, designated the PlayItem 2) as the segment to play next. As illustrated in FIG. 7B, when such playback segments have been specified, a single Virtual PlayList containing the PlayItem 1 and the PlayItem 2 is created.

Re-editing Virtual PlayLists

Next, the re-editing of Virtual PlayLists will be described. Re-editing may include modifying in points and out points in a Virtual PlayList, inserting and appending new PlayItems to a Virtual PlayList, and deleting PlayItems from a Virtual PlayList. Also, Virtual PlayLists themselves may be deleted.

Figure 8:
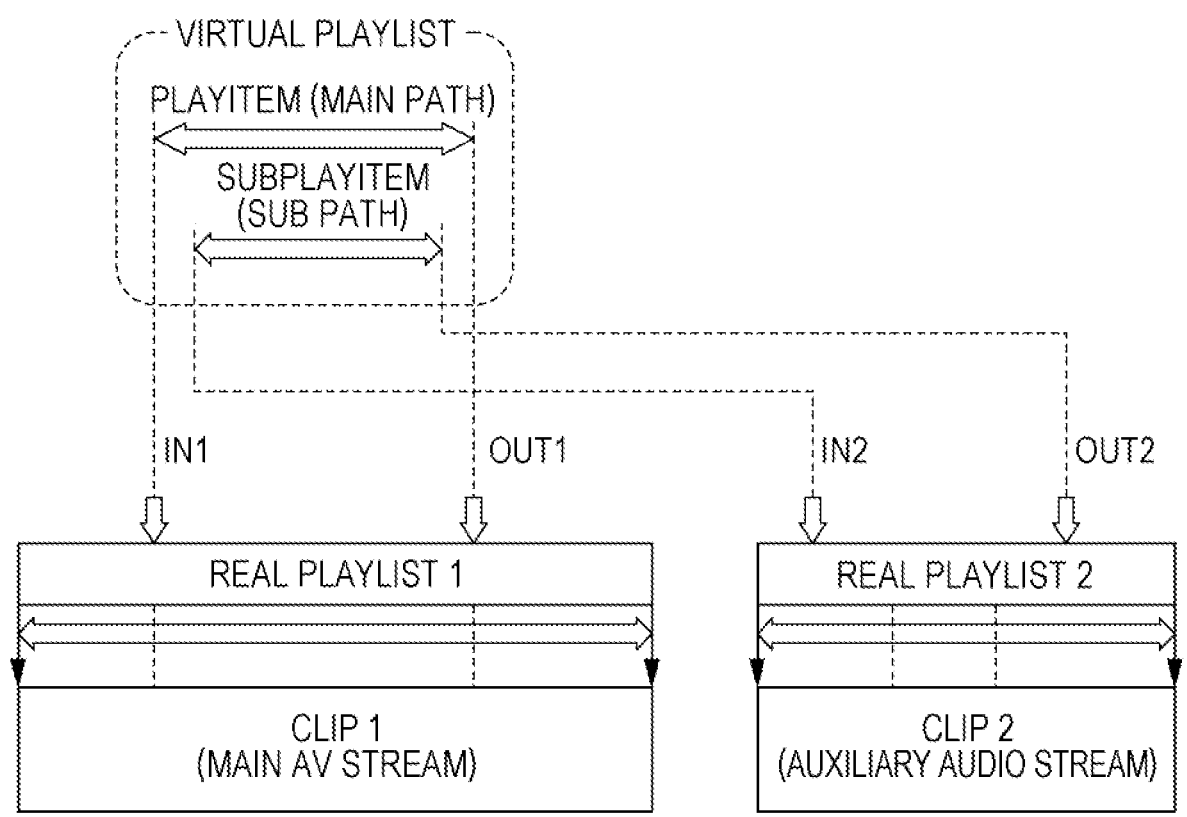
FIG. 8 explains the case of providing a sub-path in a Virtual PlayList.

FIG. 8 illustrates the dubbing (post-recording) of audio into a Virtual PlayList, an operation where an audio dub is registered in a Virtual PlayList as a sub-path. Such audio dubbing is supported by the application format. An auxiliary audio stream is added as a sub-path to the main-path AV stream in a Virtual PlayList.

Figure 9:
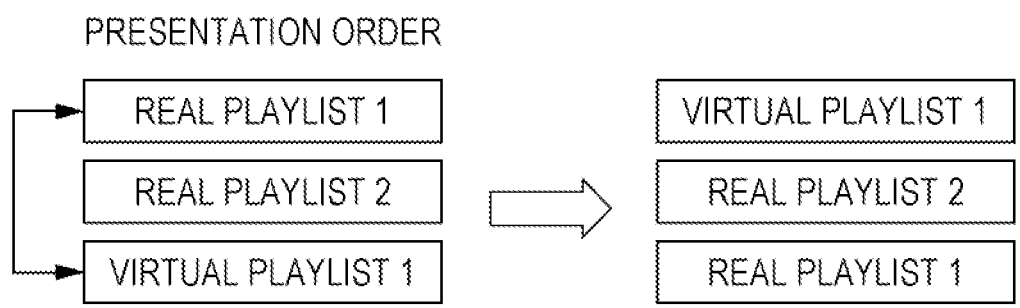
FIG. 9 explains the modification of the PlayList presentation order.
Figure 10:
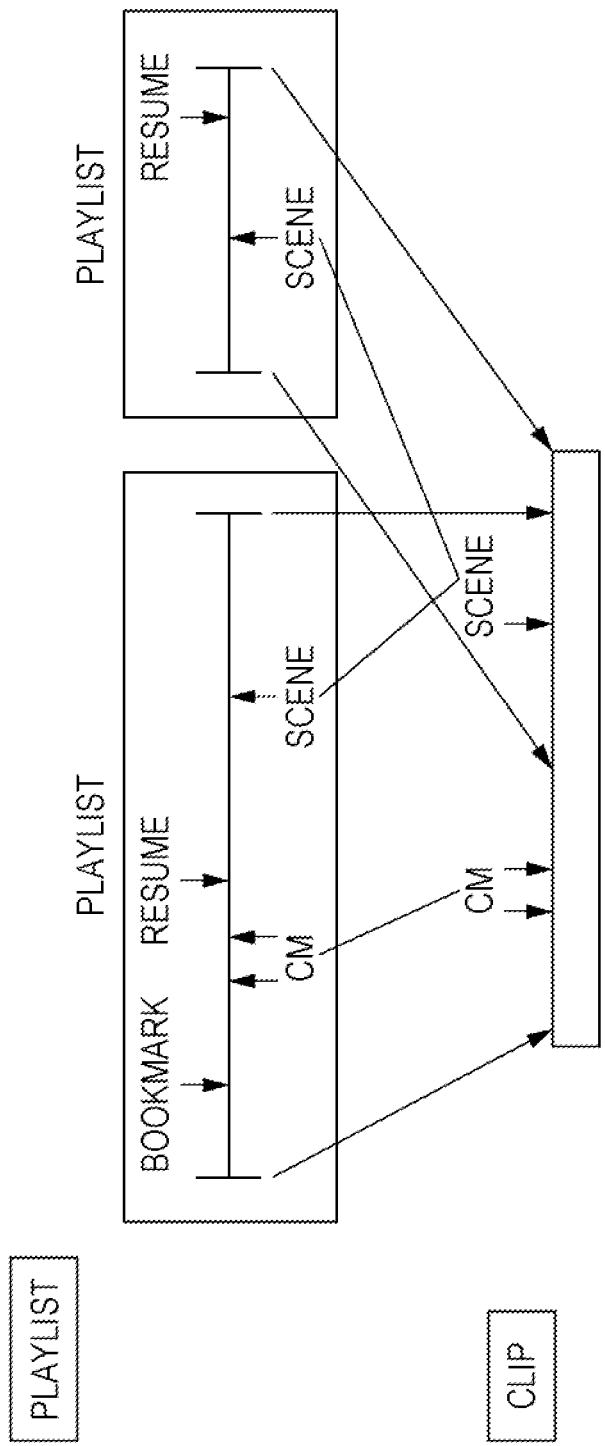
FIG. 10 explains marks in PlayLists and marks in Clips.

FIG. 9 illustrates modifying the PlayList presentation order (i.e., moving), an operation common to both Real PlayLists and Virtual PlayLists. Moving modifies the presentation order of PlayLists in a disk (Volume), and is supported by the table of PlayLists defined in the application format. Note that Clip content is not modified as a result of a move operation.

Marks

Next, marks will be described. Marks are provided in order to specify highlights or characteristic times in Clips and PlayLists. A mark added to a Clip is a point that specifies a characteristic scene attributable to the content of the AV stream, and may be a scene change point, for example. When playing back a PlayList, marks in the Clips referenced by that PlayList can be referenced and used.

Marks added to PlayLists are primarily set by the user, and may be bookmarks or a resume point, for example. A mark is set in a Clip or PlayList by adding a timestamp indicating the time of the mark to a mark list. Also, deleting a mark involves deleting that mark's timestamp from the mark list. Consequently, the AV stream is unaffected by the setting and deleting of marks.

Thumbnails

Next, thumbnails will be described. Thumbnails are still images added to Volumes, PlayLists, and Clips. There are two types of thumbnails. Thumbnails of the first type act as representative images expressing their associated content. Thumbnails of this type are primarily used on a menu screen to enable the user to select desired content by operating a cursor or other element (not illustrated). Thumbnails of the other type are images representing scenes indicated by marks.

It is desirable to enable a Volume and individual PlayLists to have their own thumbnails. It is anticipated that a Volume thumbnail will be used when a disk (i.e., a recording medium 100, which is hereinafter assumed to be a disk format and referred to as a disk where appropriate) is set in a given place on or in a recording and playback apparatus 1, with the Volume thumbnail being displayed first as a still image representing the contents of that disk. It is anticipated that PlayList thumbnails will be used as still images representing the contents of respective PlayLists on a menu screen for selecting a PlayList (i.e., a content list screen).

Figure 11:
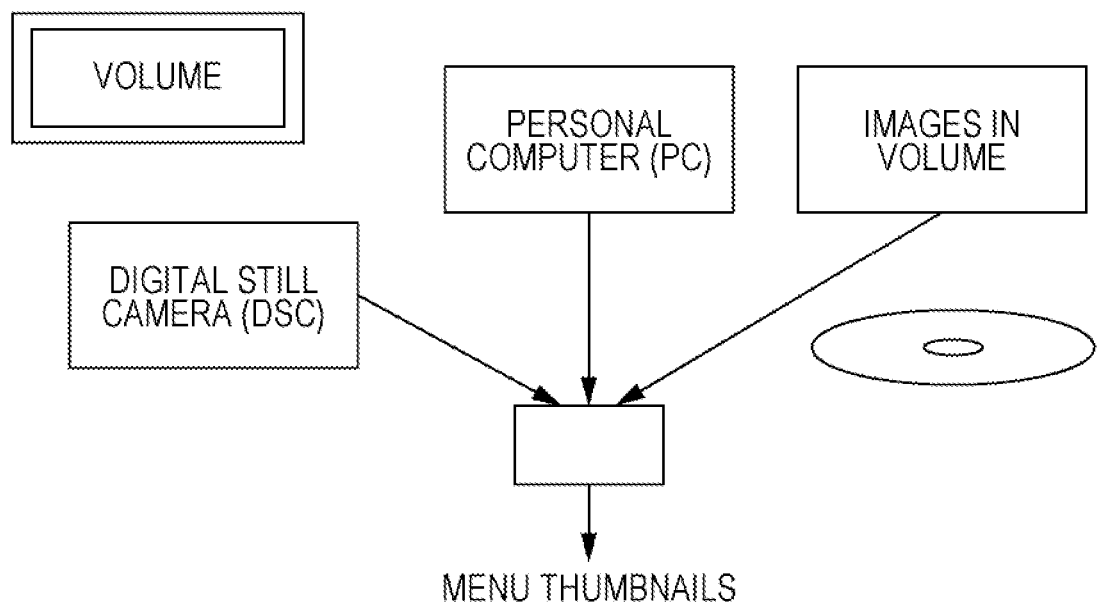
FIG. 11 explains menu thumbnails.

Although it is conceivable to take the first image in a PlayList as the thumbnail (representative image) for that PlayList, the leading image at playback time 0 may not be the optimal image for representing the contents of a PlayList. Thus, it is configured such that the user is able to set an arbitrary image as the thumbnail for a PlayList. The above two types of thumbnails are designated menu thumbnails. Since menu thumbnails are displayed frequently, it is desirable to read them quickly from disk. For this reason, it is efficient to store all menu thumbnails in a single file. Menu thumbnails are not strictly limited to being pictures extracted from video in the Volume, and may also be images acquired from a personal computer or a digital still camera, as illustrated in FIG. 11.

Meanwhile, it is desirable to be able to set a plurality of marks with respect to a Clip or PlayList, and thus it is desirable to enable easy viewing of an image at a mark point in order to ascertain the content at the mark position. Such pictures that represent mark points are designated mark thumbnails. Consequently, images to be used as the basis for such thumbnails are primarily extracted from images at mark points rather than images acquired externally.

Figure 12:
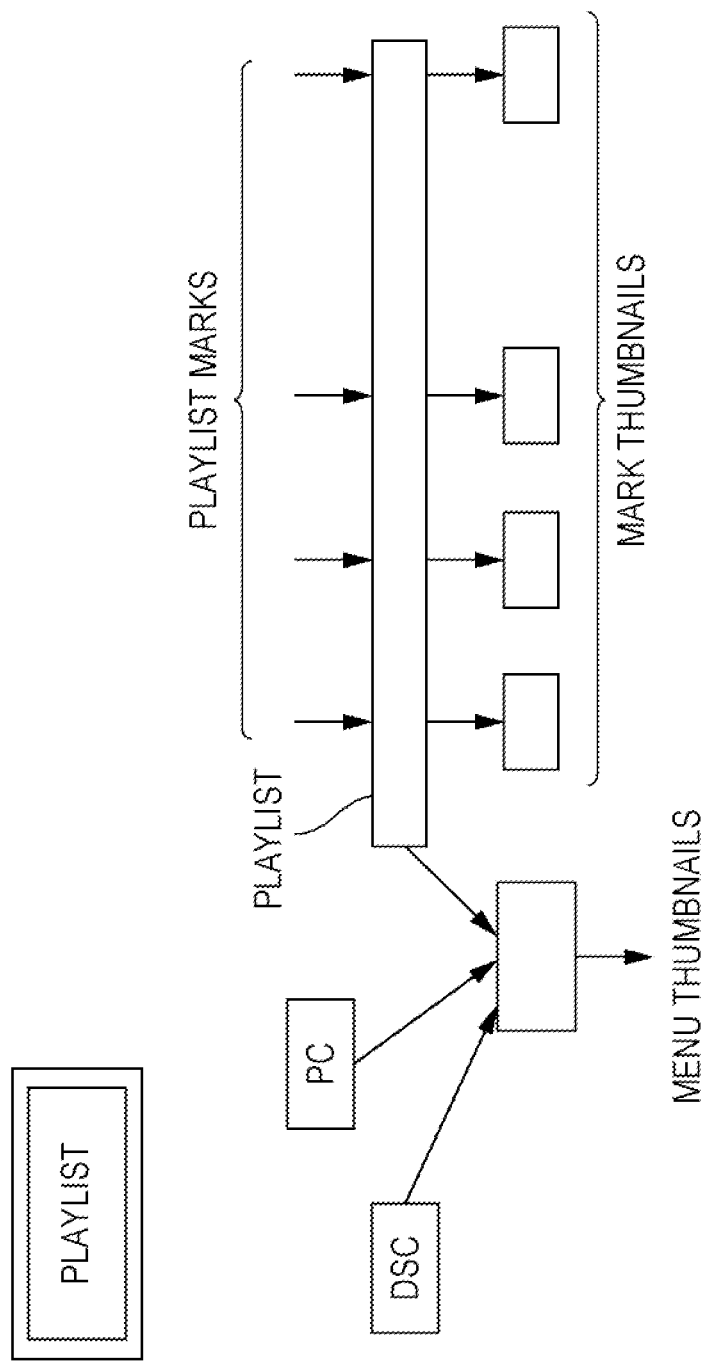
FIG. 12 explains marks added to a PlayList.
Figure 13:
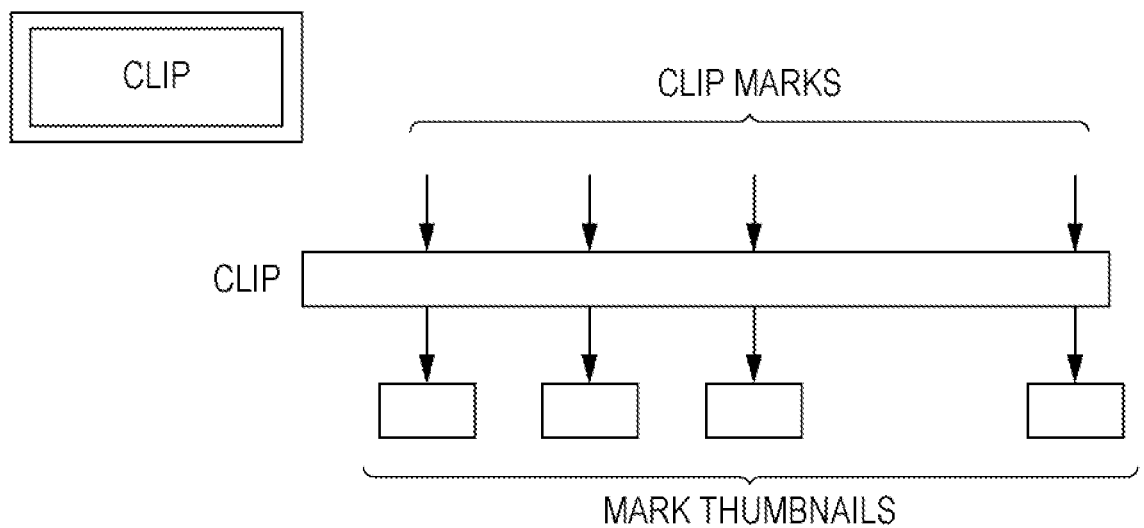
FIG. 13 explains marks added to a Clip.

FIG. 12 illustrates the relationship between marks added to a PlayList and their mark thumbnails, while FIG. 13 illustrates the relationship between marks added to Clips and their mark thumbnails. Mark thumbnails differ from menu thumbnails in that short access times are not demanded, since mark thumbnails are used in sub-menus or other elements when presenting detailed information about a PlayList. For this reason, it is not problematic for the recording and playback apparatus 1 to take some amount of time as it opens a file and reads out a portion thereof every time a thumbnail is to be displayed.

Additionally, it is desirable to store all mark thumbnails in a single file in order to reduce the number of files present in the Volume. Whereas a PlayList may have a menu thumbnail and a plurality of mark thumbnails, Clips are not typically selected directly by the user (ordinarily, Clips are specified via a PlayList), and thus Clips may not be provided with menu thumbnails.

Figure 14:
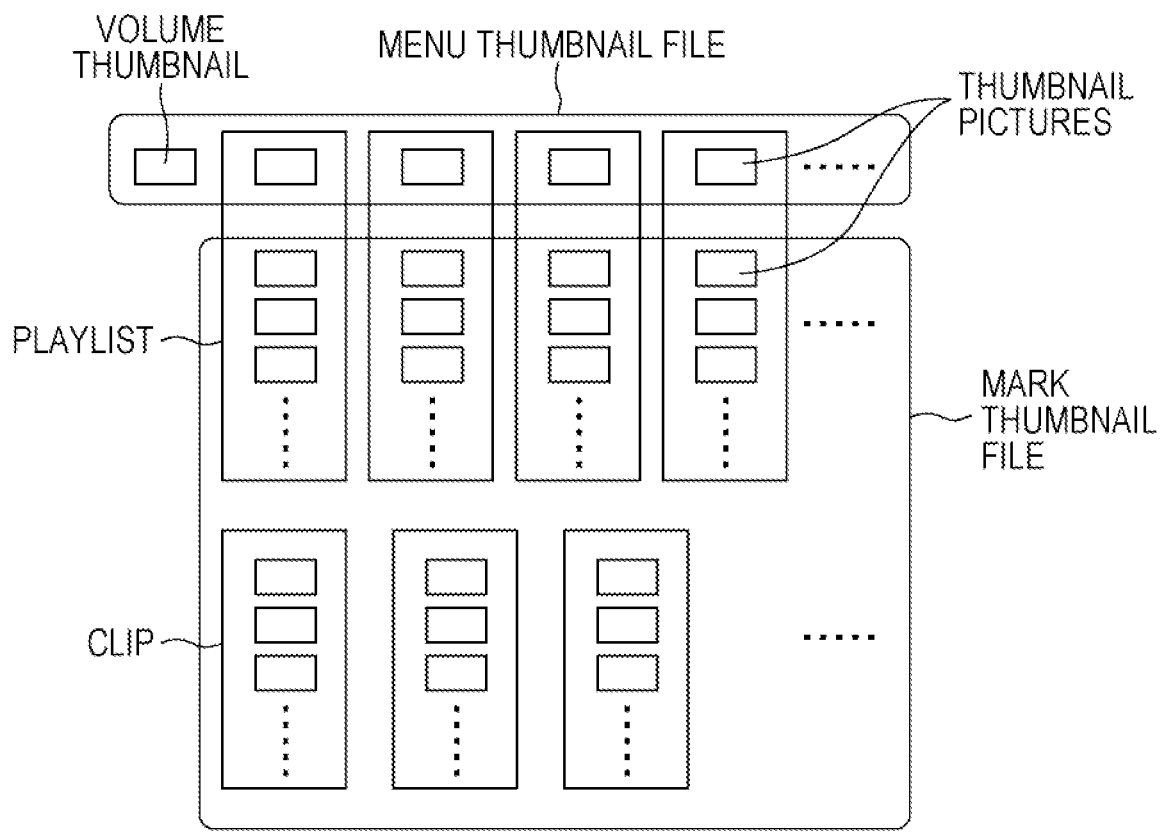
FIG. 14 explains relationships between PlayLists, Clips, and thumbnail files.

FIG. 14 illustrates relationships between menu thumbnails, mark thumbnails, PlayLists, and Clips in light of the above-described. A menu thumbnail file contains menu thumbnails provided for individual PlayLists. The menu thumbnail file includes a Volume thumbnail that represents the content of the data recorded to disk. A mark thumbnail file contains thumbnails created for individual PlayLists and individual Clips.

Directories and Files

Figure 15:
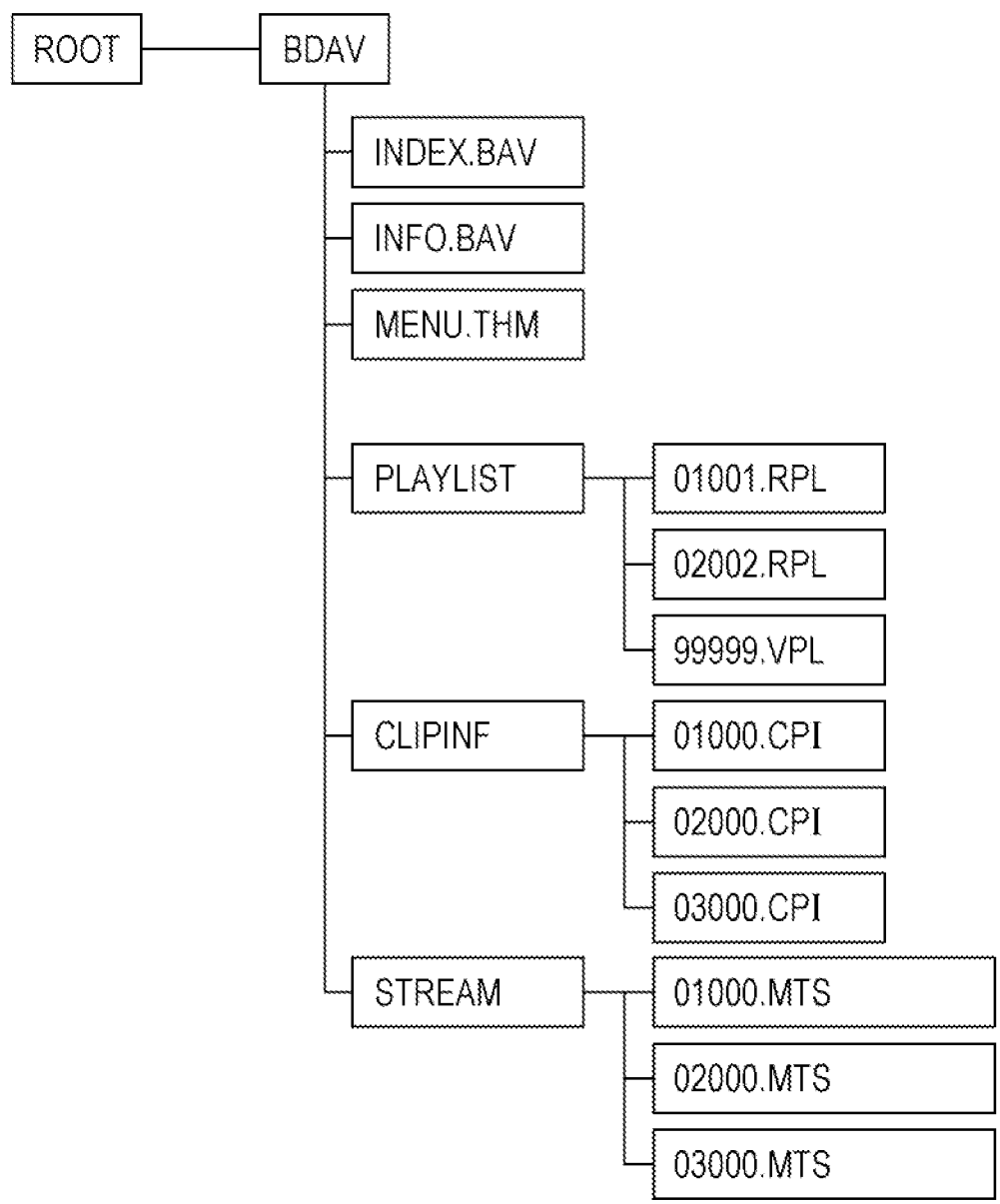
FIG. 15 explains a directory structure.

Next, directories and files will be described. Hereinafter, the recording and playback apparatus 1 will be referred to as a digital video recorder (DVR) where appropriate. FIG. 15 illustrates an exemplary directory structure on disk. As illustrated in FIG. 15, the primary directories on disk in a DVR are a root directory that includes a "BDAV" directory, as well as a "PLAYLIST" directory, a "CLIPINF" directory, and a "STREAM" directory. Directories other than the above may be created in the root directory, but are assumed to be ignored by the application format of the present embodiment.

All files and directories defined by the DVR application format are stored in the "BDAV" directory. The "BDAV" directory contains three directories. Real PlayList and Virtual PlayList database files are placed in the "PLAYLIST" directory. This directory still exists even if there are no PlayLists.

Clip database files are placed in the "CLIPINF" directory. This directory also still exists even if there are no Clips. AV stream files are placed in the "STREAM" directory. This directory still exists even if there are no AV stream files.

The "BDAV" directory stores the following files. The "INDEX.BAV" file is an index file in which display information useful for displaying a title list is extracted and collected from the UIAppInfoPlayList( ) information. Manufacturer private data for each PlayList file may also be appended and stored in the "INDEX.BAV" file. The "INDEX.BAV" file is placed in the BDAV directory, or in other words the same parent directory as the PLAYLIST directory where content is recorded, and in addition, is positioned on the same level. In other words, the "INDEX.BAV" file and the PLAYLIST directory belong to the same directory. The "INDEX.BAV" file will be discussed later in detail with reference to FIG. 17.

The "INFO.BAV" file is created in the BDAV directory and stores general application layer information. Only one INFO.BAV file exists in the BDAV directory, and its file name is fixed at INFO.BAV. The "MENU.THM" file stores information related to a menu thumbnail image (i.e., a thumbnail image for the content list). The number of menu thumbnails in the BDAV directory is 0 or 1. The file name is fixed at MENU.THM. This file may not be present in the case where no menu thumbnail image exists.

The "PLAYLIST" directory stores two types of PlayList files, these being Real PlayLists and Virtual PlayLists. An xxxxx.RPL file stores information related to one Real PlayList. One file is created for each Real PlayList. The file name is xxxxx.RPL, where xxxxx is a five-digit number with each digit ranging from 0 to 9. The file extension is "RPL".

A yyyyy.VPL file stores information related to one Virtual PlayList. One file is created for each Virtual PlayList. The file name is yyyyy.VPL, where yyyyy is a five-digit number with each digit ranging from 0 to 9. The file extension is "VPL".

The "CLIPINF" directory stores files which individually correspond to respective AV stream files. A zzzzz.CPI file is a Clip Information file that corresponds to a single AV stream file (a Clip AV stream file or a Bridge-Clip AV stream file). The file name is zzzzz.CPI, where zzzzz is a five-digit number with each digit ranging from 0 to 9. The file extension is "CPI".

The "STREAM" directory stores AV stream files. A zzzzz.MTS file is an AV stream file handled by the DVR system, or in other words a Clip AV stream file or a Bridge-Clip AV stream file. The file name is zzzzz.MTS, where zzzzz is a five-digit number with each digit ranging from 0 to 9. The file extension is "MTS".

INDEX.BAV file

Next, the "INDEX.BAV" file in FIG. 15 will be described. In order to prompt the user to select a content item recorded to the recording medium 100, a list of titles for all programs (i.e., a list of PlayLists) is created, and therefrom a displayable range is extracted and output from the terminal 24 to the user interface input/output for display. Alternatively, a displayable range may be output from the terminal 32 to a display not illustrated and displayed thereon. As discussed later with reference to FIG. 17, a single "INDEX.BAV" file collectively stores display information for all programs which is used to display a title list. As a result, it becomes possible to rapidly create and display a title list.

Figure 16:
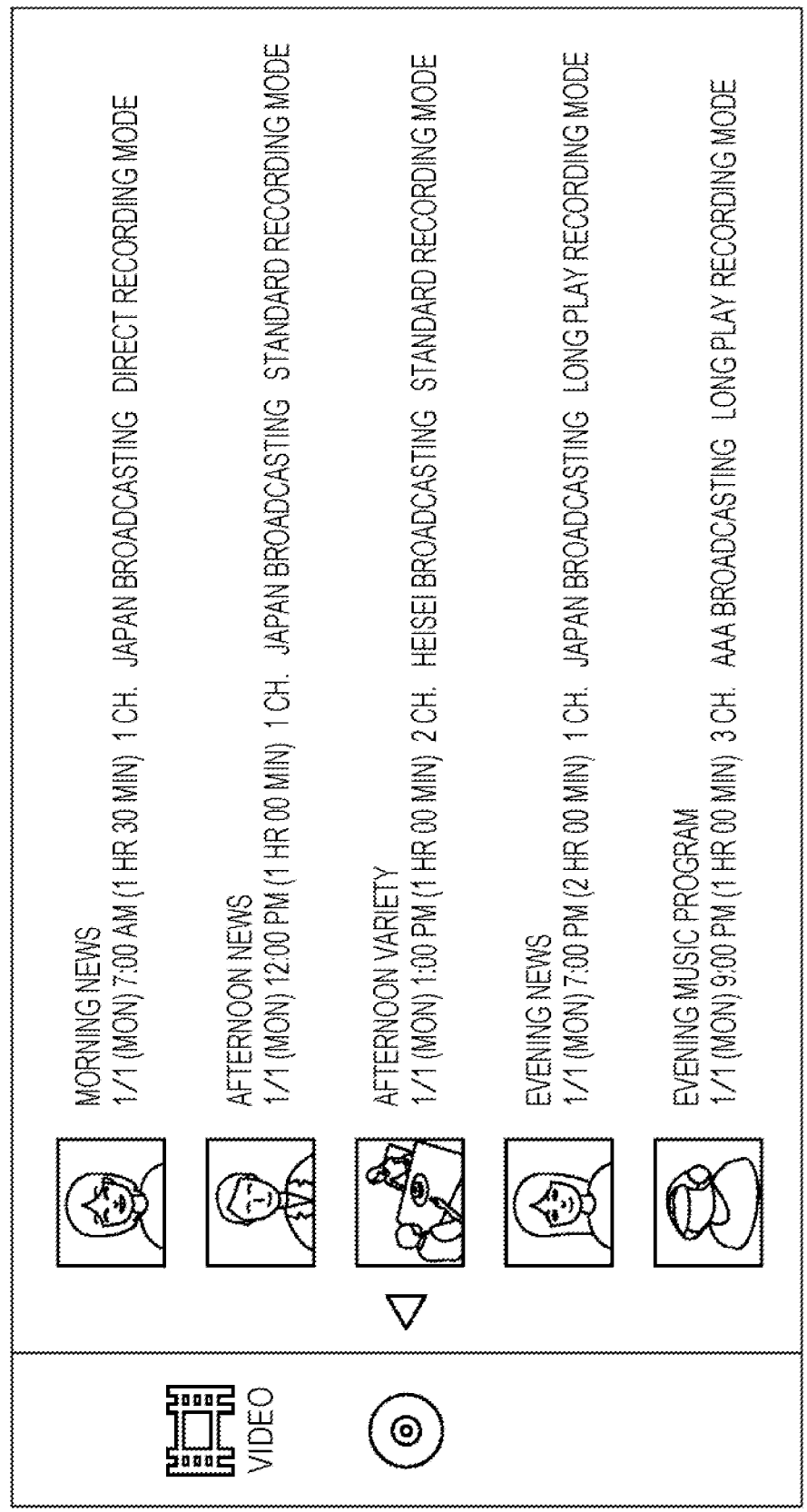
FIG. 16 illustrates an exemplary display of a title list.

FIG. 16 illustrates an exemplary display of a title list. The design of the screen display and the displayed content depends on the manufacturer of the recording and playback apparatus 1. In this example, the following display information is displayed.

Program titles: Morning News, Afternoon News, Afternoon Variety, Evening News, Evening Music Program Record times: 1/1 (Mon) 7:00 AM, 1/1 (Mon) 12:00 PM, 1/1 (Mon) 1:00 PM, 1/1 (Mon) 7:00 PM, 1/1 (Mon) 9:00 PM Program durations: 1 hr 30 min, 1 hr 00 min, 2 hr 00 min Channel numbers: CH1, CH2, CH3

Channel names: Japan Broadcasting, AAA Broadcasting

Recording modes: direct recording mode, standard recording mode, long play recording mode The title list preferably displays display information enabling the user to definitively select a desired program (i.e., title). Such display information may include information like the following, for example.

1. Title (program) name (PlayList_name)
2. Record time (time_zone, record_time_and_date)
3. Title duration (PlayList duration)
4. Thumbnail reference information (ref_to_menu_thumbnail_index)
5. Mark indicating whether recording is new (unviewed) or not (is_played_flag)
6. Channel number (channel_number)
7. Channel name (channel_name)

Among the above seven types of display information, the three types of display information labeled from 1 to 3 are particularly preferable in a title list. The display information labeled 4 is also important for enabling the user to quickly ascertain program content.

The names of the fields indicated in parenthesis following the above seven types of display information are the names of fields appearing in UIAppInfoPlayList( ) (see FIG. 21, discussed later), with the exception of ref_to_menu_thumbnail_index. Only the ref_to_menu_thumbnail_index is not included in UIAppInfoPlayList( ). The ref_to_menu_thumbnail_index field is referenced for the value of ref_thumbnail_index (see FIG. 22, discussed later) when the mark_type field of PlayListMark( ) (see FIG. 22, discussed later) in a PlayList file (see FIG. 18, discussed later) is set to a value of 0×01 or 0×02 (see FIG. 23, discussed later), which indicates a PlayList thumbnail. In other words, the value of ref_thumbnail_index is set as the value of ref_to_menu_thumbnail_index.

FIG. 17 illustrates the syntax of INDEX.BAV. As illustrated in FIG. 17, the "INDEX.BAV" file contains information like the following.

The type_indicator field contains the text "INDX". The version_number field contains four characters which indicate the version number of the INDEX.BAV file. The length field indicates the byte length starting immediately after the length field and ending at the end of the INDEX.BAV file. The number in number_of_PlayLists is equal to the number of PlayLists recorded in the PLAYLIST directory. The PlayList_file_name[k] field indicates the file name of a PlayList. Herein, [k] is a variable that is incremented during a for loop. The index info_start_address[k] field indicates the start byte address of index_info[k]( ) which is expressed as a byte offset from the leading byte in the INDEX.BAV file. The byte offset is counted starting from zero.

The ref_to_menu_thumbnail index[k] field indicates a thumbnail image representing the PlayList indicated by PlayList_file_name[k]. In the case where the ref to menu thumbnail index[k] field contains a value other than 0×FFFF, a representative thumbnail image has been added to that PlayList, and that thumbnail image is being stored in the MENU.THM file (see FIG. 15 and FIG. 24, discussed later). The image is referenced by using the value of Thumbnail( ) in the MENU.THM file (see FIG. 25, discussed later). In the case where the ref_to_menu_thumbnail_index[k] field has a value of 0×FFFF, a representative thumbnail image has not been added to that PlayList.

The PlayList_character_set[k] field indicates the character encoding method by which the channel_name[k] and PlayList_name[k] fields are encoded. The is_played_flag[k] flag indicates whether or not playback has occurred. If this flag is set to 1, the PlayList indicated by PlayList_file_name[k] has been played back since being recorded. If this flag is set to 0, the PlayList has not yet been played back since being recorded. The time_zone[k] field indicates the time zone (such as Japan or England, for example) for the time information indicated by record_time_and_date[k].

The record time and date[k] field is a 56-bit field storing the time and date when the PlayList indicated by PlayList_file_name[k] was recorded. This field stores 14 numbers regarding the year, month, day, hour, minute, and second encoded in 4-bit binary-coded decimal (BCD). For example, 2001/12/23 01:02:03 is encoded as 0×20011223010203. PlayList_duration[k] is a 24-bit field indicating the total playback time of the PlayList indicated by PlayList_file_name[k] in units of hours, minutes, and seconds. This field stores six numbers encoded in 4-bit binary-coded decimal (BCD). For example, 01:45:30 is encoded as 0×014530.

The channel_number[k] field indicates the channel number or service number of the broadcast selected by the user when the PlayList indicated by PlayList_file_name[k] was recorded. This field is invalid when its value is 0×FFFF. The channel_name_length[k] field indicates the byte length of the channel name indicated by the channel_name[k] field. The channel_name[k] field indicates the channel name or service name of the broadcast selected by the user when the PlayList indicated by PlayList_file_name[k] was recorded.

The PlayList_name_length[k] field indicates the byte length of the PlayList name indicated by the PlayList_name[k] field. The PlayList_name[k] field indicates the title (program) name of the PlayList indicated by PlayList_file_name[k].

A non-zero value in the length_mpd[k] field means that mdp[k]( ) exists, and that value indicates the byte length of mdp[k]( ). The maker_ID[k] field indicates the manufacturer of the recorder that recorded mdp[k]( ). The value encoded in maker_ID is assigned by the licensor of the format. The maker_model_code[k] field indicates the model number of the recorder that recorded mdp[k]( ). The value encoded in maker_model_code[k] is determined by a manufacturer who has received a license for the format. The maker_private_data[k] field is an area where a manufacturer's private data is stored. In this field, manufacturer-specific recording information may be stored in addition to the above information that is standardized in the INDEX.BAV file. For example, it is possible to record information such as the recording mode (information such as standard recording mode or long play recording mode) and program genre.

The length_mpd[k], maker_ID[k], maker_model_code[k], and maker_private_data[k] fields constitute manufacturer-specific information.

X and Y are arbitrary positive integers. The value of padding_word may be anything.

Real PlayList Files and Virtual PlayList Files

Next, Real PlayList files and Virtual PlayList files, or in other words the xxxxx.RPL and yyyyy.VPL files in the "PLAYLIST" directory in FIG. 15, will be described. FIG. 18 illustrates the syntax of both xxxxx.RPL (Real PlayList) and yyyyy.VPL (Virtual PlayList) files. The syntax structure is the same for xxxxx.RPL and yyyyy.VPL files. An xxxxx.RPL or yyyyy.VPL file contains three objects, these being PlayList( ), PlayListMark( ), and MakerPrivateData( ).

The PlayListMark_Start_address field indicates the start address of PlayListMark( ), which is expressed as a byte offset from the leading byte in the PlayList file. The byte offset is counted starting from zero.

The MakerPrivateData_Start_address field indicates the start address of MakerPrivateData( ), which is expressed as a byte offset from the leading byte in the PlayList file. The byte offset is counted starting from zero.

One or more padding_word fields are inserted according to the syntax of the PlayList file, while N1 and N2 are zero or arbitrary positive integers. Each padding_word may take an arbitrary value.

Although the above gives a brief overview of PlayList files, further details will now be given. Except for Bridge-Clips, the playback segments in all Clips are referenced by all Real PlayLists in the recording medium 100. Furthermore, the playback segments indicated by respective PlayItems in two or more Real PlayLists do not overlap in the same Clip.

Figure 19A:
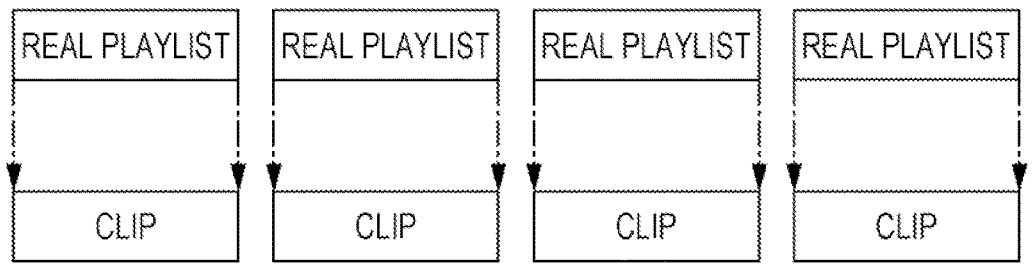
FIGS. 19A to 19C explain PlayLists.
Figure 19B:
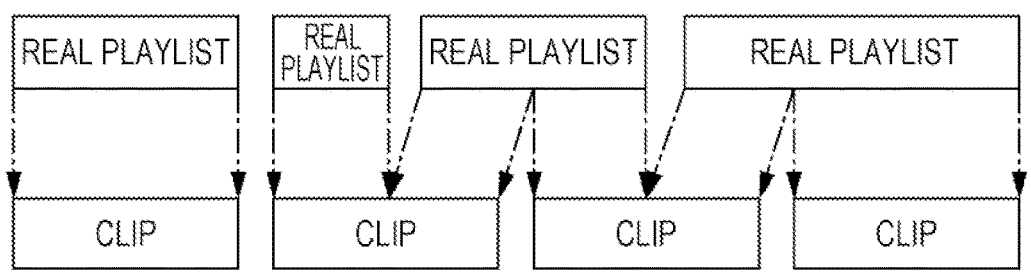
Figure 19C:
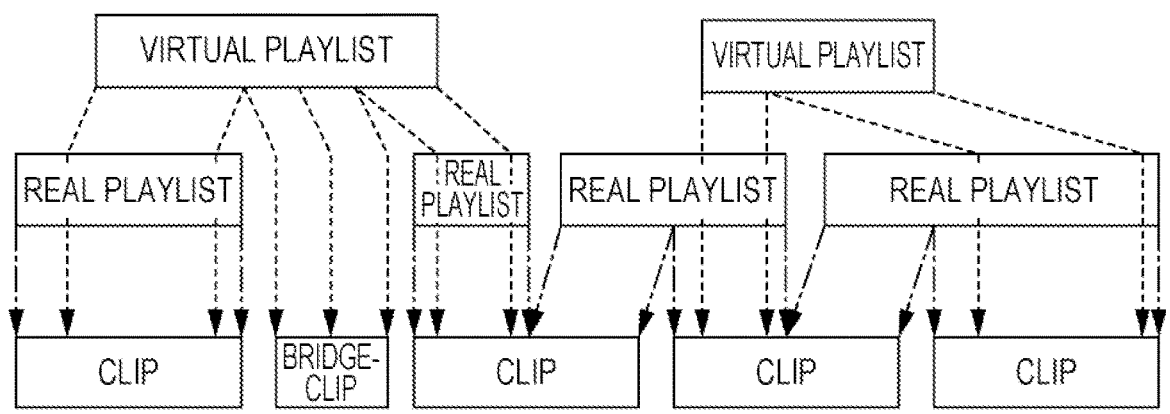

Described more fully with reference to FIGS. 19A to 19C, all Clips have a corresponding Real PlayList, as illustrated in FIG. 19A. This rule is obeyed even after editing operations, as illustrated in FIG. 19B. Consequently, since all Clips are referenced by some Real PlayList, all Clips are viewable.

As illustrated in FIG. 19C, the playback segments of a Virtual PlayList are contained within the playback segment of a Real PlayList or the playback segment of a Bridge-Clip. A Bridge-Clip ceases to exist on disk if it is not referenced by any Virtual PlayList.

A Real PlayList includes a list of PlayItems, but does not include SubPlayItems. A Virtual PlayList includes a list of PlayItems, and may include one SubPlayItem in the case where the CPI_type stated in PlayList( ) is the EP_map type and where the PlayList_type is 0 (i.e., a PlayList that includes video and audio). In the PlayList( ) object of the present embodiment, SubPlayItem is only used for the purpose of audio dubbing. In addition, the number of SubPlayItems a single Virtual PlayList can have is 0 or 1.

PlayList Syntax

Next, PlayList syntax will be described. FIG. 20 illustrates the PlayList syntax. In the PlayList syntax illustrated in FIG. 20, the version_number field contains four characters which indicate the version number of the PlayList( )

object. The version_number is encoded to "0045" in accordance with ISO 646. The length field contains a 32-bit unsigned integer that indicates the byte length of PlayList( ) starting immediately after the length field and ending at the end of PlayList( ) PlayList_type is an 8-bit field indicating the type of the PlayList.

CPI_type is a 1-bit flag indicating the value of the CPI_type field in the Clips referenced by PlayItem( ) and SubPlayItem( ). All Clips referenced by a single PlayList have the same CPI_type value defined in their respective CPI( ) objects. The number_of_PlayItems field is a 16-bit field indicating the number of PlayItems in the PlayList.

The PlayItem_id corresponding to a given PlayItem( ) is defined by the order in which that PlayItem( ) appears in a for loop containing PlayItem( ) objects. PlayItem_id starts from 0. The number_of_SubPlayItems field is a 16-bit field indicating the number of SubPlayItems in the PlayList. This value is 0 or 1. The path of an auxiliary audio stream (audio stream path) is a type of sub path.

UIAppInfoPlayList

Next, the UIAppInfoPlayList object in the PlayList syntax illustrated in FIG. 20 will be described. UIAppInfoPlayList( ) stores user interface application parameters for a PlayList. FIG. 21 illustrates the UIAppInfoPlayList syntax. The UIAppInfoPlayList syntax illustrated in FIG. 21 will be described hereinafter.

The PlayList_character_set field indicates the character encoding method by which the channel_name and PlayList_name fields are encoded. The is_played_flag field indicates whether or not the PlayList has been played back. If this flag is set to 1, the PlayList has been played back since being recorded. If this flag is set to 0, the PlayList has not yet been played back since being recorded. The time_zone field indicates the time zone for the time information indicated by record_time_and_date.

The record time and date field is a 56-bit field storing the time and date when the PlayList was recorded. This field stores 14 numbers regarding the year, month, day, hour, minute, and second encoded in 4-bit binary-coded decimal (BCD). For example, 2001/12/23 01:02:03 is encoded as 0x20011223010203. The PlayList_duration field is a 24-bit field indicating the total playback time of the PlayList in units of hours, minutes, and seconds. This field stores six numbers encoded in 4-bit binary-coded decimal (BCD). For example, 01:45:30 is encoded as 0x014530.

The channel_number field indicates the channel number or service number of the broadcast selected by the user when the PlayList was recorded. This field is invalid when its value is 0xFFFF. The channel_name_length field indicates the byte length of the channel name indicated by the channel_name field. The channel_name field indicates the channel name or service name of the broadcast selected by the user when the PlayList was recorded. The PlayList_name_length field indicates the byte length of the PlayList name. The PlayList_name field indicates the title (program) name of the PlayList.

PlayListMark( )

Next, the PlayListMark( ) object in the syntax of xxxxx.RPL and yyyyy.VPL files illustrated in FIG. 18 will be described. Mark information for a PlayList is stored in PlayListMark. FIG. 22 illustrates the syntax of PlayListMark. In the PlayListMark syntax illustrated in FIG. 22, the version number field contains four characters which indicate the version number of the PlayListMark( ) object. The version number is encoded to "0045" in accordance with ISO 646.

The length field contains a 32-bit unsigned integer that indicates the byte length of PlayListMark( ) starting immediately after the length field and ending at the end of PlayListMark( ). The number_of_PlayList_marks field contains a 16-bit unsigned integer indicating the number of marks being stored in PlayListMark. The value of number_of_PlayList_marks may also be 0. The mark_type field is an 8-bit field indicating the mark_type, and is encoded according to the table illustrated in FIG. 23, discussed later.

The mark_time_stamp field is a 32-bit field storing a timestamp that indicates the point specified by a mark. The semantics of mark_time_stamp differs depending on the CPI_type defined in PlayList( ). PlayItem_id is an 8-bit field specifying a PlayItem where a mark is placed. The PlayItem_id value corresponding to a given PlayItem is defined in PlayList( ) (see FIG. 20).

The character_set field is an 8-bit field indicating the character encoding method by which the mark_name field is encoded. The name_length field is an 8-bit field indicating the byte length of the mark_name indicated in the mark_name field. The mark_name field indicates the name of a mark. In this field, a number of bytes equal to name_length and starting from the left express valid characters which indicate the mark name. Values following the valid characters in the mark_name field may be set to any value.

The ref_thumbnail_index field indicates information on a thumbnail image attached to a mark. In the case where the ref_thumbnail_index field contains a value other than 0xFFFF, a thumbnail image has been attached to that mark, and that thumbnail image is being stored in the MENU.THM file. The image is referenced by using the value of ref thumbnail index in the MENU.THM file. In the case where the ref_thumbnail_index field has a value of 0xFFFF, a thumbnail image has not been attached to that mark.

FIG. 23 illustrates a mark_type table. As illustrated in FIG. 23, the mark_type is defined by the value of mark_type. A mark_type value of 0x01 means that the mark is a PlayList thumbnail whose image has been selected from a picture in video referenced by that PlayList.

In this case, mark_time_stamp (FIG. 22) indicates the presentation timestamp of the picture in the video referenced by the PlayList. When the value of ref_thumbnail_index (FIG. 22) is other than 0xFFFF, a thumbnail image is stored in MENU.THM of FIG. 24, discussed later. When the value of ref thumbnail index is other 0xFFFF, a thumbnail image is not being stored in MENU.THM of FIG. 24. In this case, the player may decode a picture specified by the presentation timestamp in the video referenced by the PlayList. The number of marks with a mark_type value of 0x01 or 0x02 in PlayListMark( ) is 0 or 1.

A mark_type value of 0x02 means that the mark is a PlayList thumbnail whose image has not been selected from a picture in video referenced by that PlayList.

In this case, the value of ref_thumbnail_index is other than 0xFFFF, and a thumbnail image is stored in MENU.THM of FIG. 24. Both mark_time_stamp and PlayItem_id are set to zero. The number of marks with a mark_type value of 0x01 or 0x02 in PlayListMark( ) is 0 or 1.

A mark_type value of 0x03 means that the mark is a Resume-mark. This mark is the point where playback is resumed. The number of resume points defined in PlayListMark( ) is 0 or 1.

A mark_type value of 0x04 means that the mark is a playback entry point into a PlayList. Such a mark may be set by the user, and is used to specify the start point of a favorite scene, for example.

A mark_type value of 0x06 means that the mark is a skip mark point. The player skips the rest of the program from this point until the end. The number of skip mark points defined in PlayListMark( ) is 0 or 1.

MENU.THM and MARK.THM

FIG. 24 illustrates the syntax of MENU.THM in FIG. (or MARK.THM). The MENU.THM file contains a Thumbnail( ) object.

FIG. 25 illustrates the syntax of Thumbnail( ) within the syntax of MENU.THM (or MARK.THM) illustrated in FIG. 24. In the Thumbnail( ) syntax illustrated in FIG. 24, the version_number field contains four characters which indicate the version number of the Thumbnail( ) object. The version number is encoded to "0045" in accordance with ISO 646.

The length field contains a 32-bit unsigned integer that indicates the byte length of Thumbnail( ) starting immediately after the length field and ending at the end of Thumbnail( ). The tn_blocks_start_address field contains a 32-bit unsigned integer indicating the leading byte address of the first tn_block, expressed as a byte offset from the leading byte in Thumbnail( ). The byte offset is counted starting from zero. The number of thumbnails field contains a 16-bit unsigned integer which gives the number of thumbnail image entries contained in Thumbnail( ).

The tn_block_size field contains a 16-bit unsigned integer which gives the size of a single tn_block, in units of 1024 bytes. For example, tn_block_size=1 indicates that the size of a single tn_block is 1024 bytes. The number_of_tn_blocks field contains a 16-bit unsigned integer expressing the number of tn_block entries in Thumbnail( ). The thumbnail index field contains a 16-bit unsigned integer expressing an index number for a thumbnail image indicated by thumbnail information in one iteration of a for loop that starts from the thumbnail_index field. Values other than 0xFFFF are used in the thumbnail_index field. The thumbnail_index field is referenced by ref_thumbnail_index in UIAppInfoVolume( ), UIAppInfoPlayList( ), PlayListMark( ), and ClipMark( ).

The thumbnail_picture format contains an 8-bit unsigned integer expressing the picture format of a thumbnail image.

The picture_data_size field contains a 32-bit unsigned integer indicating the byte length of a thumbnail image in units of bytes. The start_tn_block_number field is a 16-bit unsigned integer expressing the tn_block number of the tn_block where the data for a thumbnail image starts. The start of the thumbnail image data preferable matches the leading tn_block. The tn_block number starts at 0 and is related to the value of the variable k in the tn_block for loop.

The x_picture length field contains a 16-bit unsigned integer expressing the number of pixels in the horizontal direction of the thumbnail image frame. The y_picture_length field contains a 16-bit unsigned integer expressing the number of pixels in the vertical direction of the thumbnail image frame. The tn_block fields are areas where thumbnail images are stored. All tn_block fields in Thumbnail( ) are the same size (fixed-length), with the size being defined by tn_block_size.

AV Stream Files

Next, AV stream files will be described. AV stream files are stored as MTS files in the "STREAM" directory (FIG. 15). There are two types of AV stream files, these being Clip AV stream files and Bridge-Clip AV stream files. Both types of AV streams are structured as DVR MPEG-2 transport stream files.

Recording Process

Figure 26:
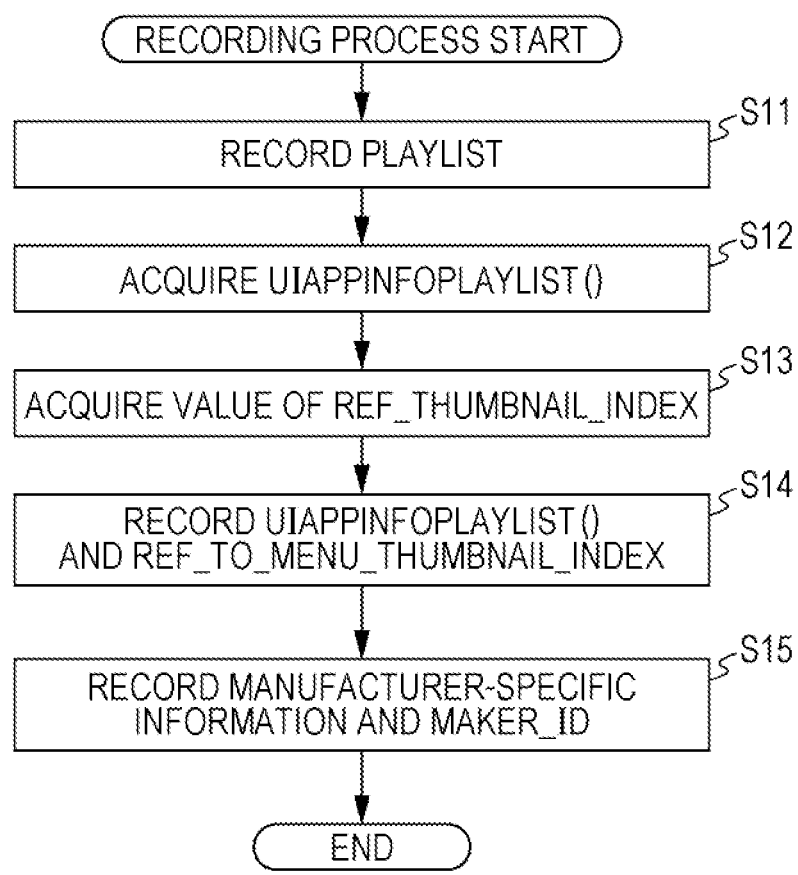
FIG. 26 is a flowchart explaining a recording process.

Next, a process of recording an INDEX.BAV file to the recording medium 100 will be described with reference to FIG. 26. FIG. 26 is a flowchart explaining a recording process. This process is executed as an associated process when content in the form of a program is recorded to the recording medium 100 on the basis of user instructions.

In step S11, the recording unit 201 records a PlayList file. In other words, an xxxxx.RPL or yyyyy.VPL file as illustrated in FIG. 18 which corresponds to the content is recorded to the recording medium 100.

In step S12, the acquiring unit 202 acquires UIAppInfoPlayList( ). In other words, UIAppInfoPlayList( ) is read out from PlayList( ) of FIG. 20, which was recorded to the recording medium 100 as part of an xxxxx.RPL or yyyyy.VPL file of FIG. 18 in step S11.

In step S13, the acquiring unit 202 acquires the value of ref_thumbnail_index. In other words, the value of ref thumbnail index is acquired from PlayListMark( ) of FIG. 22, which was recorded to the recording medium 100 as part of an xxxxx.RPL or yyyyy.VPL file of FIG. 18 in step S11, and the acquired value of ref thumbnail index is set as ref to menu thumbnail index.

In step S14, the recording unit 201 records UIAppInfoPlayList( ) and ref_to_menu_thumbnail_index. In other words, information on UIAppInfoPlayList( ) (FIG. 21) acquired in step S12 and information on ref_to_menu_thumbnail_index set in step S13 is recorded to an INDEX.BAV file (FIG. 17) in the recording medium 100.

As illustrated in FIG. 21, UIAppInfoPlayList( ) contains information such as PlayList_character_set, playback_protect_flag, write_protect_flag, is_played_flag, is_edited_flag, time_zone, record_time_and_date, PlayList_duration, maker_ID, maker_model_code, channel_number, channel_name_length, channel_name, PlayList_name_length, PlayList_name, PlayList_detail_length, and PlayList_detail.

In step S15, the recording unit 201 records manufacturer-specific information and maker_ID. The manufacturer-specific information and maker_ID for the manufacturer of the recording and playback apparatus 1 is stored in advance in the storage unit 23A of the controller 23. This information is read out and recorded to the INDEX.BAV file in the recording medium 100.

In other words, maker_ID, maker_mode_code, and maker_private_data are recorded.

Display process

Figure 27:
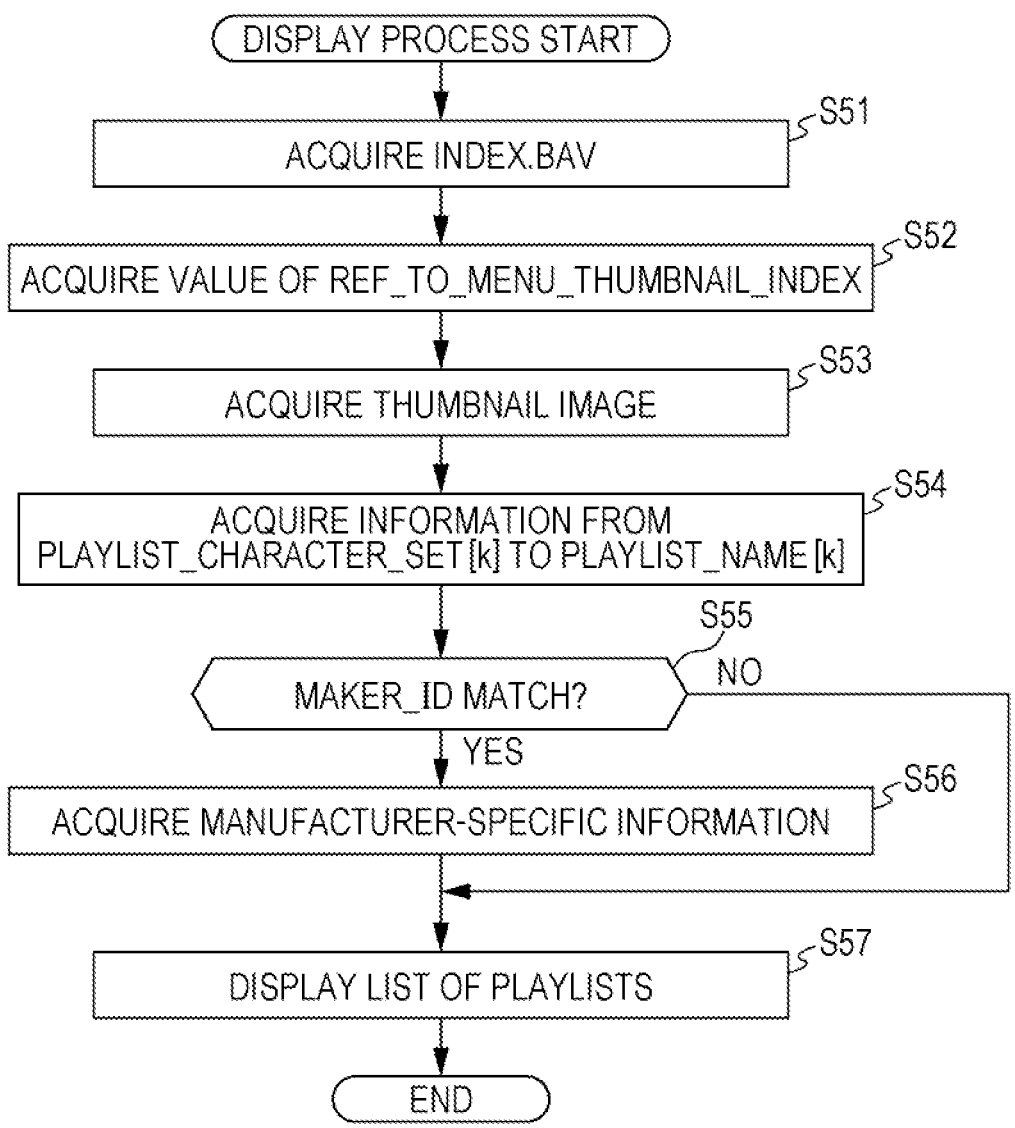
FIG. 27 is a flowchart explaining a display process.

Next, a process of displaying a content list will be described with reference to FIG. 27. FIG. 27 is a flowchart explaining a display process.

In step S51, the acquiring unit 202 acquires an INDEX.BAV file. In other words, the acquiring unit 202 reads out an INDEX.BAV that has been recorded to the recording medium 100 as described with reference to FIG. 26.

In step S52, the acquiring unit 202 acquires the value of ref_to_menu_thumbnail_index for a single PlayList (content item). In other words, the value of ref_to_menu_thumbnail_index is acquired from the INDEX.BAV file (FIG. 17) that was read out in step S51. The ref_to_menu_thumbnail_index field expresses location information for thumbnails stored in MENU.THM (FIG. 24). In step S53, the acquiring unit 202 acquires a thumbnail image. In other words, a thumbnail image (Thumbnail( )) is read out from the location (i.e., a location in MENU.THM) indicated by the value of ref_to_menu_thumbnail_index acquired in step S52. Since the size of INDEX.BAV will increase if the thumbnail images themselves are stored inside, thumbnail images are stored in the separate file MENU.THM.

In step S54, the acquiring unit 202 acquires the information from PlayList_character_set[k] to PlayList_name[k]. In other words, the acquiring unit 202 reads out the information from PlayList_character_set[k] to PlayList_name[k] being stored in INDEX.BAV as illustrated in FIG. 17.

Specifically, PlayList_character_set[k], is_played_flag, time_zone, record_time_and_date[k], PlayList_duration[k], channel_number[k], channel_name_length[k], channel_name[k], PlayList_name_length[k], and PlayList_name[k] are read out.

In step S55, the determining unit 203 determines if the maker_ID values match. In other words, it is determined whether or not the maker_ID value stored in INDEX.BAV (FIG. 17) that was read out in step S51 matches the maker_ID value stored in the storage unit 23A. If both values match, the recording unit 201 acquires manufacturer-specific information in step S56. In other words, the recording unit 201 reads out the maker_model code and maker_private_data fields stored in INDEX.BAV that was read out in step S51.

If the maker_ID values do not match, it may be difficult to display the information in maker_private_data as a list, and thus the processing in step S56 is skipped.

The above process is executed for each content item (PlayList).

Once the processing from step S52 to step S56 has been executed for each content item (PlayList), the displaying unit 204 displays a list of PlayLists in step S57. In other words, a content list like that illustrated in FIG. 16 is displayed on the basis of the information acquired in step S54 and the information acquired in step S56.

Display information relevant to the display of a list is collectively stored in a single file called INDEX.BAV. Consequently, a content list can be rapidly displayed, even when there are many content items.

Applying Present Technology to Program

The foregoing series of processing operations may be executed in hardware, and may also be executed in software.

In the case of executing the series of processing operations in software, a program constituting such software may be installed from a network or recording medium onto a computer built into special-purpose hardware, or alternatively, onto a computer capable of executing various functions by installing various programs thereon, such as a general-purpose personal computer, for example.

A recording medium containing such a program may be realized separately from the main apparatus as a removable medium such as a magnetic disk (including floppy disks), an optical disc (including Compact Disc-Read-Only Memory (CD-ROM) and DVD discs), or semiconductor memory upon which the program is recorded and which is distributed in order to provide the user with the program. Moreover, the recording medium may also be realized as flash ROM or a hard disk upon which the program is recorded and which is provided to the user in a state of being already built into the main apparatus.

Furthermore, in this specification, the steps describing a program recorded to a recording medium obviously encompass processing operations conducted in a time series following the stated order, but also encompass operations executed in parallel or individually without strictly being processed in a time series.

In addition, embodiments of the present technology are not limited to the foregoing embodiments, and various modifications are possible within a scope that does not depart from the principal matter of the present technology. Other The present technology may also take configurations like the following.

(1) An information processing apparatus provided with an acquiring unit configured to acquire display information relevant to displaying a list of content recorded to a recording medium, and
a recording unit configured to collectively record the display information in a single file.

(2) The information processing apparatus according to (1), wherein
the display information at least includes the title, duration, and record time and date for each content item.

(3) The information processing apparatus according to (1) or (2), wherein
the file is positioned on the same level as a directory where the content items are recorded.

(4) The information processing apparatus according to (1), (2), or (3), wherein
the display information additionally includes location information expressing the locations of thumbnails for the content items, and
the acquiring unit acquires titles, durations, and record times and dates for the content items from a first information file, while acquiring the location information from a second information file that differs from the first information file.

(5) The information processing apparatus according to any of (1) to (4), wherein
information regarding the manufacturer of the information processing apparatus is additionally recorded in the file.

(6) The information processing apparatus according to any of (1) to (5), additionally including
a displaying unit configured to display a list of the content items from the display information read out from the file.

(7) The information processing apparatus according to (6), wherein
the display information additionally includes an ID for the manufacturer of the information processing apparatus and information specific to that manufacturer, and
the displaying unit additionally displays the manufacturer-specific information in the case where the manufacturer ID included in the display information matches a manufacturer ID being stored in the information processing apparatus.

(8) An information processing method that involves
acquiring display information relevant to displaying a list of content recorded to a recording medium, and
collectively recording the display information in a single file.

(9) A program causing a computer to execute a process that involves
acquiring display information relevant to displaying a list of content recorded to a recording medium, and
collectively recording the display information in a single file.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a storage unit configured to store a specific manufacture ID;
an acquiring unit configured to acquire display information to display a plurality of content items, wherein
the display information comprises content information of the plurality of content items in a first information file, location information of a plurality of thumbnails in a second information file different from the first information file, an identifier (ID) of a manufacturer of the information processing apparatus, a recording mode of each content item of the plurality of content items and a genre associated with each content item of the plurality of content items,
the plurality of thumbnails corresponds to the plurality of content items,
the content information comprises at least one of title, duration, record time, or record date for a respective content item of the plurality of content items, and
the location information comprises a location of each thumbnail of the plurality of thumbnails stored in a directory;
a recording unit configured to record the display information in a single index file in the directory, wherein the directory includes a management file comprising management information of the display information;
a determination unit configured to determine that the ID of the manufacturer included in the display information matches the specific manufacturer ID stored in the storage unit of the information processing apparatus; and
a display unit configured to:
display a list of the plurality of content items based on the single index file; and
display the recording mode of each content item of the plurality of content items and the genre associated with each content item of the plurality of content items based on the determination that the ID of the manufacturer included in the display information matches the specific manufacturer ID stored in the storage unit.

2. The information processing apparatus according to claim 1, wherein the single index file is on a same directory level where the plurality of content items is recorded.

3. The information processing apparatus according to claim 1, wherein the display unit is further configured to display the plurality of content items.

4. An information processing method, comprising:
in an information processing apparatus:
acquiring display information to display a plurality of content items, wherein
the display information comprises content information of the plurality of content items in a first information file, location information of a plurality of thumbnails in a second information file different from the first information file, an identifier (ID) of a manufacturer of the information processing apparatus, a recording mode of each content item of the plurality of content items and a genre associated with each content item of the plurality of content items,
the plurality of thumbnails corresponds to the plurality of content items,
the content information comprises at least one of title, duration, record time, or record date for a respective content item of the plurality of content items, and
the location information comprises a location of each thumbnail of the plurality of thumbnails stored in a directory;
recording the display information in a single index file in the directory, wherein
the directory includes a management file comprising management information of the display information;
determining that the ID of the manufacturer included in the display information matches a specific manufacturer ID stored in a storage unit of the information processing apparatus;
displaying a list of the plurality of content items based on the single index file; and
displaying the recording mode of each content item of the plurality of content items and the genre associated with each content item of the plurality of content items based on the determination that the ID of the manufacturer included in the display information matches the specific manufacturer ID stored in the storage unit.

5. A non-transitory computer-readable medium having stored thereon computer-readable instructions, which when executed by a computer, cause the computer to execute operations, the operations comprising:
acquiring display information to display a plurality of content items, wherein
the display information comprises content information of the plurality of content items in a first information file, location information of a plurality of thumbnails in a second information file different from the first information file, an identifier (ID) of a manufacturer of an information processing apparatus, a recording mode of each content item of the plurality of content items and a genre associated with each content item of the plurality of content items,
the plurality of thumbnails corresponds to the plurality of content items,
the content information comprises at least one of title, duration, record time, or record date for a respective content item of the plurality of content items, and
the location information comprises a location of each thumbnail of the plurality of thumbnails stored in a directory;
recording the display information in a single index file in the directory, wherein the directory includes a management file comprising management information of the display information;
determining that the ID of the manufacturer included in the display information matches a specific manufacturer ID in a storage unit of the information processing apparatus;
displaying a list of the plurality of content items based on the single index file; and
displaying the recording mode of each content item of the plurality of content items and the genre associated with each content item of the plurality of content items based on the determination that the ID of the manufacturer included in the display information matches the specific manufacturer ID stored in the storage unit.

\* \* \* \* \*